United States Patent
Lee

(10) Patent No.: US 11,072,085 B2
(45) Date of Patent: Jul. 27, 2021

(54) JIG FOR FABRICATING CONCAVE-CONVEX STRUCTURE AND CONCAVE-CONVEX STRUCTURE FABRICATION METHOD USING SAME

(71) Applicant: Hyun-Jin Lee, Changwon-si (KR)

(72) Inventor: Hyun-Jin Lee, Changwon-si (KR)

( * ) Notice: Subject to any disclaimer, the term of this patent is extended or adjusted under 35 U.S.C. 154(b) by 341 days.

(21) Appl. No.: 16/064,031

(22) PCT Filed: Jul. 15, 2016

(86) PCT No.: PCT/KR2016/007743
§ 371 (c)(1),
(2) Date: Jun. 20, 2018

(87) PCT Pub. No.: WO2017/111236
PCT Pub. Date: Jun. 29, 2017

(65) Prior Publication Data
US 2018/0370068 A1    Dec. 27, 2018

(30) Foreign Application Priority Data
Dec. 24, 2015 (KR) .................. 10-2015-0186379

(51) Int. Cl.
B27C 5/06        (2006.01)
B27C 5/10        (2006.01)
(Continued)

(52) U.S. Cl.
CPC .............. B27C 5/06 (2013.01); B23Q 35/102 (2013.01); B27C 5/02 (2013.01); B27C 5/10 (2013.01);
(Continued)

(58) Field of Classification Search
CPC ...... B27F 1/00; B27F 1/02; B27F 1/04; B27F 1/08; B27F 1/10; B27F 1/12; B27F 1/14;
(Continued)

(56) References Cited

U.S. PATENT DOCUMENTS 2,916,342 A  * 12/1959 Neergaard ......... G05B 19/4207
                                                       360/6
3,109,466 A    11/1963 Jones
(Continued)

FOREIGN PATENT DOCUMENTS

DE          647420 C       7/1937
GB          854425 A      11/1960
(Continued)

OTHER PUBLICATIONS

Highland Woodworking, Multi-Router Round Tenon Templates, Sep. 4, 2015, <https://web.archive.org/web/20150904103700/https://www.highlandwoodworking.com/multi-routerroundtenontemplates.aspx> (Year: 2015).*

(Continued)

*Primary Examiner* — Teresa M Ekiert
*Assistant Examiner* — Sarkis A Aktavoukian
(74) *Attorney, Agent, or Firm* — Rabin & Berdo, P.C.

(57) ABSTRACT

The present invention provides a jig for fabricating a concave-convex structure. The jig for fabricating a concave-convex structure is coupled to a multipurpose woodworking device including a woodworking work table for performing a plurality of operations for forming a concave-convex structure and a router mounted on the woodworking work table to perform the operations for forming a concave-convex structure, using a plurality of end mills. Furthermore, the jig for fabricating a concave-convex structure includes at least one of a wood piece support jig supporting or fixing a wood piece to be fabricated, a shaping guide jig allowing for forming shapes corresponding to the operations for forming a concave-convex structure, and a stopper jig (Continued)

maintaining X-axial movement of the router by intervals corresponding to the operations for forming a concave-convex structure. Accordingly, it is possible to easily fabricate circular, round, rectangular, dovetailed, and gallery-shaped grooves and joints.

13 Claims, 25 Drawing Sheets

(51) Int. Cl.
  *B23Q 35/10* (2006.01)
  *B27C 5/02* (2006.01)
  *B27F 1/12* (2006.01)
  *B27F 1/10* (2006.01)
  *B27F 5/02* (2006.01)
  *B27F 1/02* (2006.01)

(52) U.S. Cl.
  CPC .................. *B27F 1/10* (2013.01); *B27F 1/12* (2013.01); *B27F 5/02* (2013.01); *B27F 1/02* (2013.01)

(58) Field of Classification Search
  CPC ...... B27F 1/16; B27F 5/02; B27F 5/00; B27F 5/12; B23Q 9/0064; B23Q 9/0071; B23Q 9/0078; B23Q 35/102; B23Q 35/101; B23Q 35/105; B23Q 16/001; B23Q 5/52; B23Q 2705/24; B23Q 35/04; B23Q 35/26; B23Q 35/28; B23Q 35/42; B23Q 35/44; B23Q 35/46; B23Q 35/48; B23C 1/16; B27C 5/003
  USPC ................ 409/130, 184, 209, 210, 214, 218
  See application file for complete search history.

(56) References Cited

U.S. PATENT DOCUMENTS

| | | |
|---|---|---|
| 3,858,630 A | 1/1975 | Cherry et al. |
| 4,098,170 A | 7/1978 | Russell |
| 4,561,478 A | 12/1985 | Fields |
| 4,840,209 A | 6/1989 | Reneau |
| 5,123,463 A | 6/1992 | Grisley |
| 5,305,812 A | 4/1994 | Ferencsik |
| 5,318,082 A * | 6/1994 | Von Hollen ........... B23Q 35/44 144/144.1 |
| 5,494,089 A | 2/1996 | Lubbe |
| 2009/0188584 A1 | 7/2009 | Stepp |
| 2010/0006180 A1 | 1/2010 | Yang |
| 2013/0202378 A1 | 8/2013 | Yamane et al. |

FOREIGN PATENT DOCUMENTS

| | | | |
|---|---|---|---|
| GB | 1312917 A | * | 4/1973 |
| GB | 2526361 A | * | 11/2015 |
| JP | 02-167652 A | | 6/1990 |
| JP | 2012-139802 A | | 7/2012 |
| KR | 20-0373063 Y1 | | 1/2005 |
| KR | 20-0392421 Y1 | | 8/2005 |
| KR | 10-1176871 B1 | | 8/2012 |
| KR | 10-2012-0115919 A | | 10/2012 |
| KR | 10-1198066 B1 | | 11/2012 |
| WO | WO 85/02139 A1 | | 5/1985 |
| WO | WO 03/061902 A1 | | 7/2003 |

OTHER PUBLICATIONS

Jackdaw Innovation, Clone 4D—Router Duplicator—Joinery, May 17, 2013, <https://www.youtube.com/watch?v=sJD1tFBV5wQ> (Year: 2013).*

Jackdaw Innovation, Clone 4D—Router Duplicator—Design Features, Feb. 19, 2013, <https://www.youtube.com/watch?v=Hswsexx3NOw> (Year: 2013).*

* cited by examiner

JIG FOR FABRICATING CONCAVE-CONVEX STRUCTURE AND CONCAVE-CONVEX STRUCTURE FABRICATION METHOD USING SAME

TECHNICAL FIELD

The present invention relates to a jig for fabricating a concave-convex structure, the jig being coupled to a multi-purpose woodworking device, thereby being able to easily form circular, round, rectangular, dovetailed, and gallery-shaped grooves and joints, and a method of fabricating a concave-convex structure using the jig.

BACKGROUND ART

As generally known in the art, a woodworking machine is a machine that fabricates wood pieces in accordance with types and forms, and for example, there are a router, a boring machine, and a deburring machine.

A cutter such as a table saw is used to cut raw wood pieces, a router is used to partial machining, layer, rounding, and molding of wood pieces, a boring machine is used to form various shapes of holes in wood pieces, and a deburring machine is use to grind the surfaces of wood pieces.

Concave-convex structures that are used for constructing wooden structures are combined through grooves and joints. When a first wood piece and a second wood piece are combined by circular grooves and circular joints, circular grooves are formed at coupling portions of the first wood piece and the second wood piece, circular joints are formed by making long timbers in a circular shape and then cutting the timbers by a necessary length, and both ends of the circular joints are inserted into the circular grooves, whereby the first wood piece and the second wood piece can be combined.

The concave-convex structures such as the circular grooves and the circular joints should be combined by forming grooves at the coupling portions and then forming joints. Accordingly, it takes a long time to form the circular grooves and the circular joints, so the productivity in wood piece fabrication is low.

RELATED ART DOCUMENT

Patent Document

1. Korean Patent No. 10-1176871 (registered on 2012 Aug. 20): An auto wood piece engraving
2. Korean Utility Model No. 20-0373063 (registered on 2005 Jan. 5): Router for wood piece processing
3. Korean Utility Model No. 20-0392421 (registered on 2005 Aug. 2): Apparatus for making groove in log

DISCLOSURE

Technical Problem

The present invention provides a jig for fabricating a concave-convex structure, the jig being coupled to a multi-purpose woodworking device, thereby being able to easily fabricate grooves or joints having a circular shape, a round shape, a wood piece coupling shape, a dovetail shape, and a gallery shape, etc., and a method of fabricating a concave-convex structure using the jig for fabricating a concave-convex structure.

Furthermore, the preset invention provides a jig for fabricating a concave-convex structure, the jig being able to simultaneously form grooves and joints by coupling a jig for fabricating a concave-convex structure, which includes a shaping guide jig and a stopper jig that correspond to circular joints or round joints, to a woodworking work table; and by forming circular grooves or round grooves and circular joints or round joints that correspond to the grooves, respectively, at the portion to be jointed of a first wood piece and a second wood piece, thereby being able to easily fabricate a concave-convex structure within short time, and a method of fabricating a concave-convex structure using the jig for fabricating a concave-convex structure.

Furthermore, the preset invention provides a jig for fabricating a concave-convex structure, the jig being able to simultaneously form rectangular grooves and joints by coupling a jig for fabricating a concave-convex structure, which includes a wood piece support jig and a stopper jig that correspond to rectangular joints or dovetail joints, to a woodworking work table; and by forming rectangular joints or dovetail joints at the portion to be jointed of a first wood piece and a second wood piece, thereby being able to easily fabricate a concave-convex structure within short time, and a method of fabricating a concave-convex structure using the jig for fabricating a concave-convex structure.

Furthermore, the preset invention provides a jig for fabricating a concave-convex structure, the jig being able to easily form gallery groove having a desired size within short time by coupling a jig for fabricating a concave-convex structure, which includes a wood piece support jig or a shaping guide jig that corresponds to the gallery grooves, to a woodworking work table, and then by forming gallery grooves using the jig for fabricating a concave-convex structure, a method of fabricating a concave-convex structure using the jig for fabricating a concave-convex structure.

The objects of the present invention are not limited to those described above and other objects not stated herein would be understood by those who have ordinary skills in the art that the present invention belongs to from the following description.

Technical Solution

According to an aspect of the present invention, there is provided a jig for fabricating a concave-convex structure, the jig for fabricating a concave-convex structure being coupled to a multipurpose woodworking device including a woodworking work table for performing a plurality of operations for forming a concave-convex structure and a router mounted on the woodworking work table to perform the operations for forming a concave-convex structure, using a plurality of end mills, and the jig for fabricating a concave-convex structure including at least one of a wood piece support jig supporting or fixing a wood piece to be fabricated, a shaping guide jig allowing for forming shapes corresponding to the operations for forming a concave-convex structure, and a stopper jig maintaining X-axial movement of the router by intervals corresponding to the operations for forming a concave-convex structure.

According to a second aspect of the present invention, there is provided a method of fabricating a concave-convex structure using a jig for fabricating a concave-convex structure, the method including: mounting a circle-forming guide jig and a circle-forming stopper jig on a woodworking work table to form circular grooves and circular joints; fixing a first wood piece to form the circular grooves thereon on the woodworking work table while supporting the first wood piece on a side of a fabrication position support plate of the circle-forming guide jig; forming the circular groove on the first wood piece by adjusting a Z-axial position of a router after fixing a Y-axial position having an end mill for forming the circular grooves and the circular joints and fixing an X-axial direction of the router using interval grooves on the circle-forming stopper jig; and repeatedly forming the circular groove on the first wood piece by adjusting the X-axial position of the router using the interval grooves.

According to a third aspect of the present invention, there is provided a method of fabricating a concave-convex structure using a jig for fabricating a concave-convex structure, the method including: mounting a rounding guide jig and a rounding stopper jig on a woodworking work table to form round grooves and round joints; fixing a first wood piece to form the round grooves thereon on the woodworking work table while supporting the first wood piece on a side of a fabrication position support plate of the rounding guide jig; and forming the round grooves on the first wood piece by adjusting a Z-axial position of a router having an end mill for forming the round grooves and the round joints after fixing a Y-axial position of the router and maintaining the router to be movable left and right by a length of the round grooves using interval grooves on the rounding stopper jig.

According to a fourth aspect of the present invention, there is provided a method of fabricating a concave-convex structure using a jig for fabricating a concave-convex structure, the method including: mounting a rectangular tail-forming support jig and a rectangular tail-forming stopper jig on a woodworking work table to form rectangular joints; fixing a first wood piece to form a first-wood piece rectangular joint thereon on a wood piece support plate disposed inside the rectangular tail-forming support jig; fixing an X-axial position of a router having an end mill for forming the rectangular joints using a first groove of interval groves on the rectangular tail-forming stopper jig; forming a first joint end of the first-wood piece rectangular joint by fixing a Z-axial position of the router and the moving the router in a front-rear direction of the woodworking work table; forming a next joint end of the first-wood piece rectangular joint by moving the router in the front-rear direction after fixing the X-axial position of the router at a next position using a next groove of the interval grooves; and forming a necessary number of the joint ends of the first-wood piece rectangular joint by repeating the forming of a next joint end.

According to a fifth aspect of the present invention, there is provided a method of fabricating a concave-convex structure using a jig for fabricating a concave-convex structure, the method including: mounting a dovetail-forming support jig and a dovetail-forming stopper jig on a woodworking work table to form dovetail joints; fixing a first wood piece to form a first-wood piece dovetail joint thereon on a wood piece support plate disposed inside the dovetail-forming support jig; fixing an X-axial position of a router having an end mill for forming the dovetail joints using a first groove of interval groves on the dovetail-forming stopper jig; forming a first first-side of the first-wood piece dovetail joint by fixing a Z-axial position of the router and the moving the router in a front-rear direction of the woodworking work table; forming a first second-side and a next joint end of the first-wood piece dovetail joint by moving the router in the front-rear direction after fixing the X-axial position of the router at a next position using a next groove of the interval grooves; and forming a necessary number of the joint end of the first-wood piece dovetail joints by repeating the forming of a first second-side and a next first-side.

According to a sixth aspect of the present invention, there is provided a method of fabricating a concave-convex structure using a jig for fabricating a concave-convex structure, the method including: mounting a gallery groove-forming support jig on a woodworking work table to form gallery grooves; fixing a wood piece to form the gallery grooves thereon on the woodworking work table while supporting the wood piece on a side of a fabrication position support plate of the gallery groove-forming guide jig; moving a Y-axial position of a router having an end mill for forming the gallery grooves to a fabrication position; and forming the gallery grooves obliquely to a side by adjusting and moving a Y-axial position and a Z-axial position of the router along a router guide groove of the gallery groove-forming guide jig.

According to a seventh aspect of the present invention, there is provided a method of fabricating a concave-convex structure using a jig for fabricating a concave-convex structure, the method including: mounting a gallery groove-forming support jig on a woodworking work table to form gallery grooves; fixing a wood piece to form the gallery groove thereon, using a wood piece holder with a fabrication position maintained with reference to a position indicator on the gallery groove-forming support jig, after putting the wood piece on the gallery groove-forming support jig; fixing a Y-axial position of a router having an end mill for forming the gallery groove; and forming the gallery grooves by moving the router by intervals of the gallery grooves by adjusting an X-axial position and a Z-axial position of the router.

Advantageous Effects

According to the present invention, it is possible to easily form various shapes of grooves or joints such as circular, round, rectangular, dovetailed, and gallery-shaped grooves and joints by coupling and mounting jigs for fabricating a concave-convex structure corresponding to various joints to a multipurpose woodworking device.

Furthermore, according to the preset invention, it is possible to simultaneously form grooves and joints by coupling a jig for fabricating a concave-convex structure, which includes a shaping guide jig and a stopper jig that correspond to circular joints or round joints, to a woodworking work table; and by forming circular grooves or round grooves and circular joints or round joints that correspond to the grooves, respectively, at the portion to be jointed of a first wood piece and a second wood piece, so it is possible to easily fabricate a concave-convex structure within short time.

Furthermore, according to the preset invention, it is possible to simultaneously form rectangular grooves and joints by coupling a jig for fabricating a concave-convex structure, which includes a wood piece support jig and a stopper jig that correspond to rectangular joints or dovetail joints, to a woodworking work table; and by forming rectangular joints or dovetail joints at the portion to be jointed of a first wood piece and a second wood piece, so it is possible to easily fabricate a concave-convex structure within short time.

Furthermore, it is possible to easily form gallery groove having a desired size within short time by coupling a jig for fabricating a concave-convex structure, which includes a wood piece support jig or a shaping guide jig that corresponds to the gallery grooves, to a woodworking work table, and then by forming gallery grooves using the jig for fabricating a concave-convex structure.

BEST MODE

Figure 1:
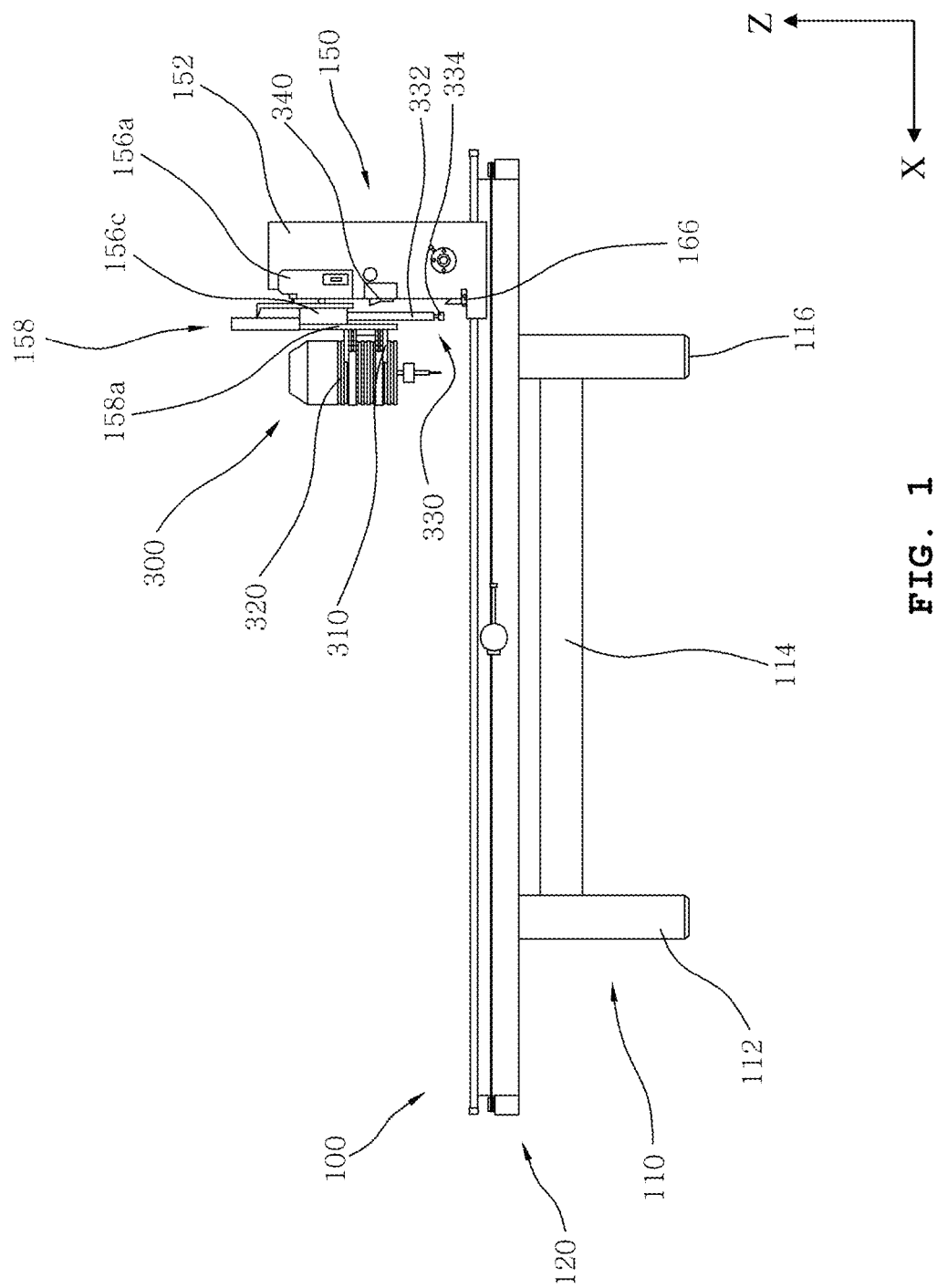
FIGS. 1 to 9 are views showing an example of a multi-purpose woodworking device to which a jig for fabricating a concave-convex structure according to an embodiment of the present invention is coupled.
Figure 2:
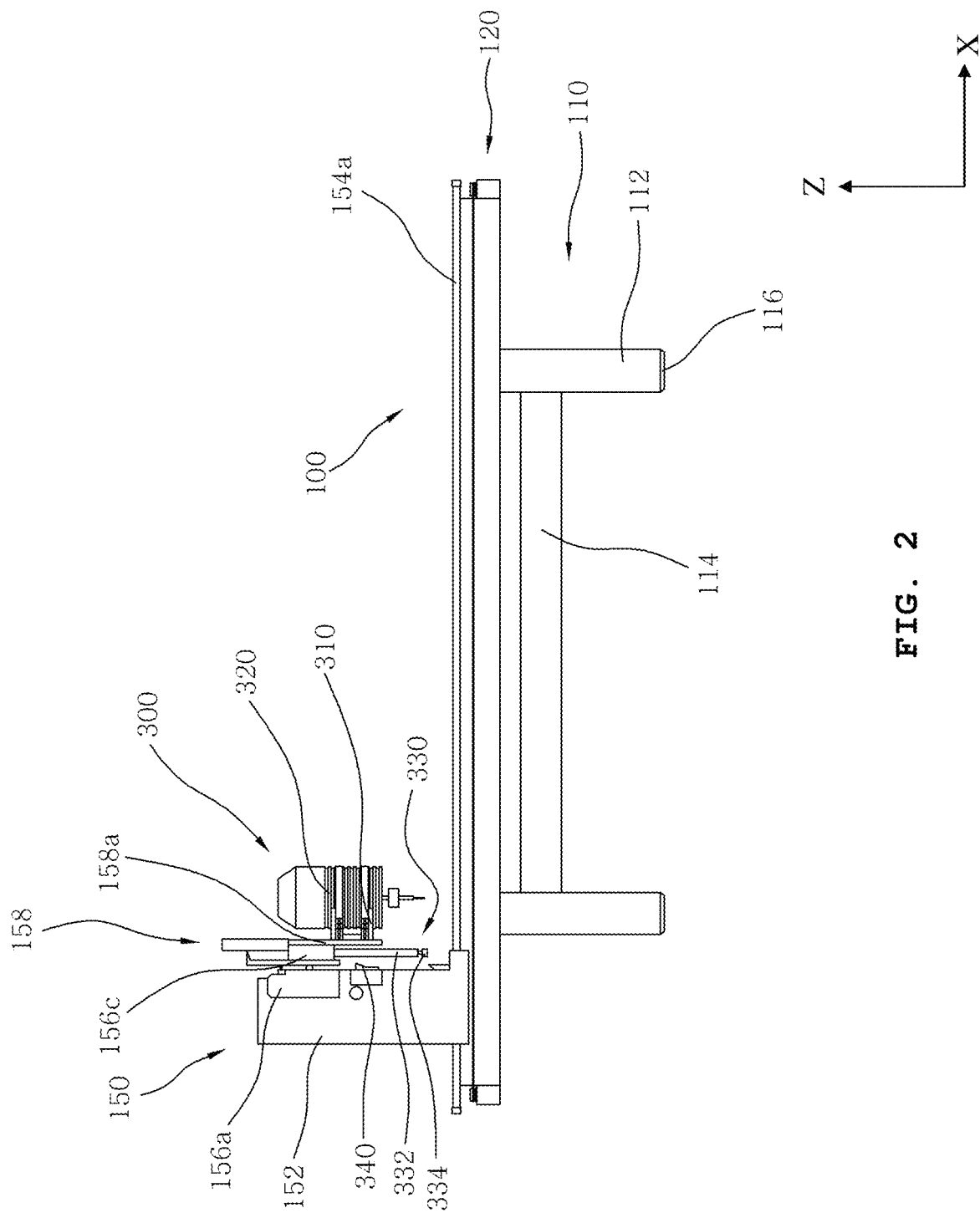
Figure 3:
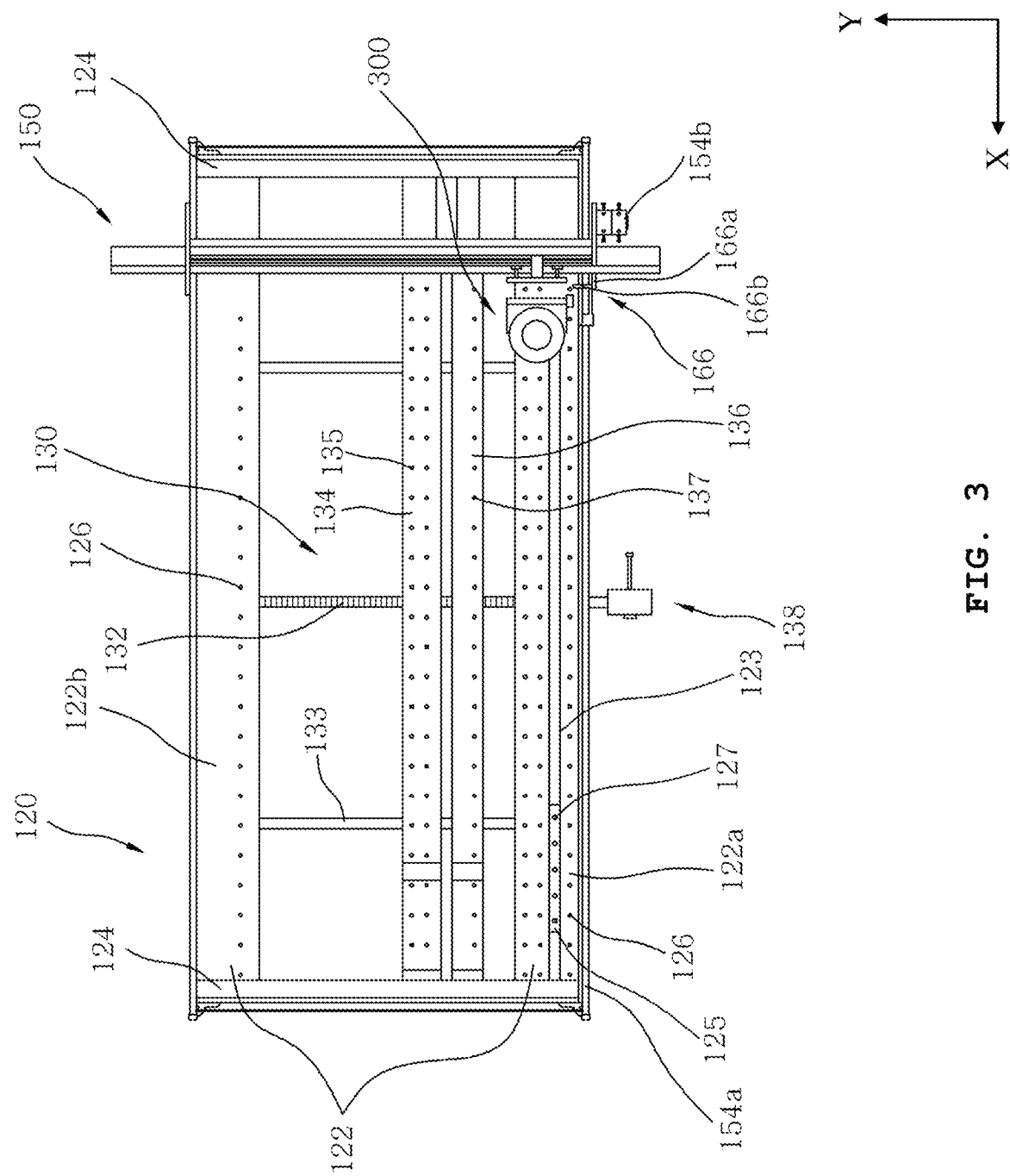

The advantages and features of the present invention, and methods of achieving them will be clear by referring to the exemplary embodiments that will be describe hereafter in detail with reference to the accompanying drawings. However, the present invention is not limited to the exemplary embodiments described hereafter and may be implemented in various ways, and the exemplary embodiments are provided to complete the description of the present invention and let those skilled in the art completely know the scope of the present invention and the present invention is defined by claims. Like reference numerals indicate like components throughout the specification.

In the following description of the present invention, detailed descriptions of well-known functions or configurations relating to the present invention will not be provided so as not to obscure the description of the present invention with unnecessary details. Furthermore, the terminologies described below are terminologies determined in consideration of the functions in the present invention and may be construed in different ways by the intention of users and operators. Therefore, the definitions thereof should be construed based on the contents throughout the specification.

Hereinafter, embodiments of the present invention are described in detail with reference to the accompanying drawings.

Figure 10A:
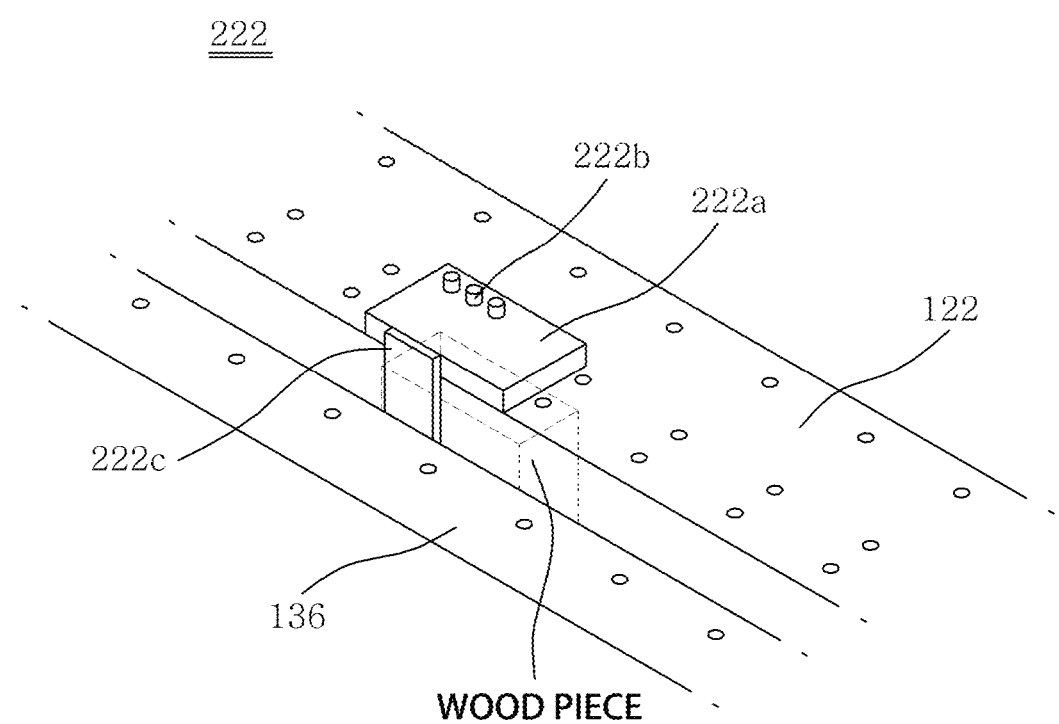
FIGS. 10a and 10b are views showing an example of a jig for fabricating a concave-convex structure for forming circular grooves and circular joints in accordance with a first embodiment of the present invention.
Figure 10B:
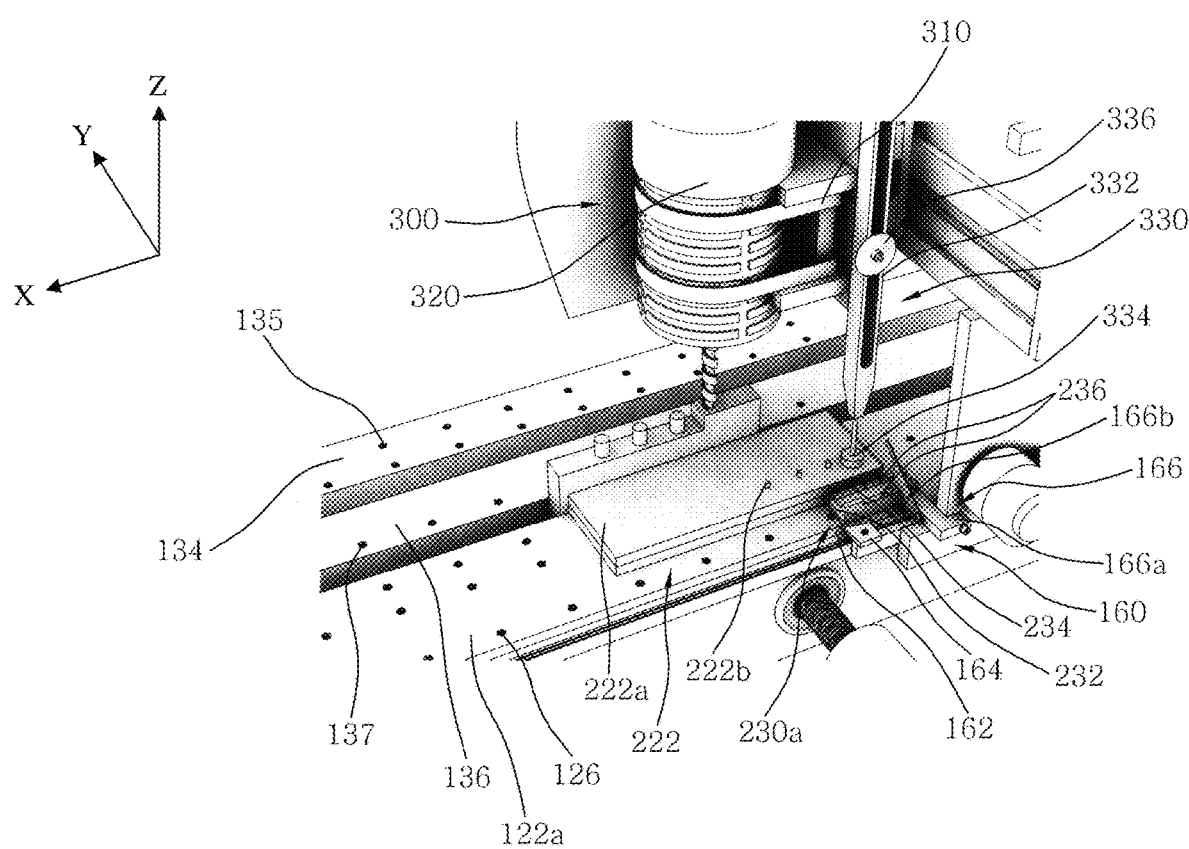
Figure 11A:
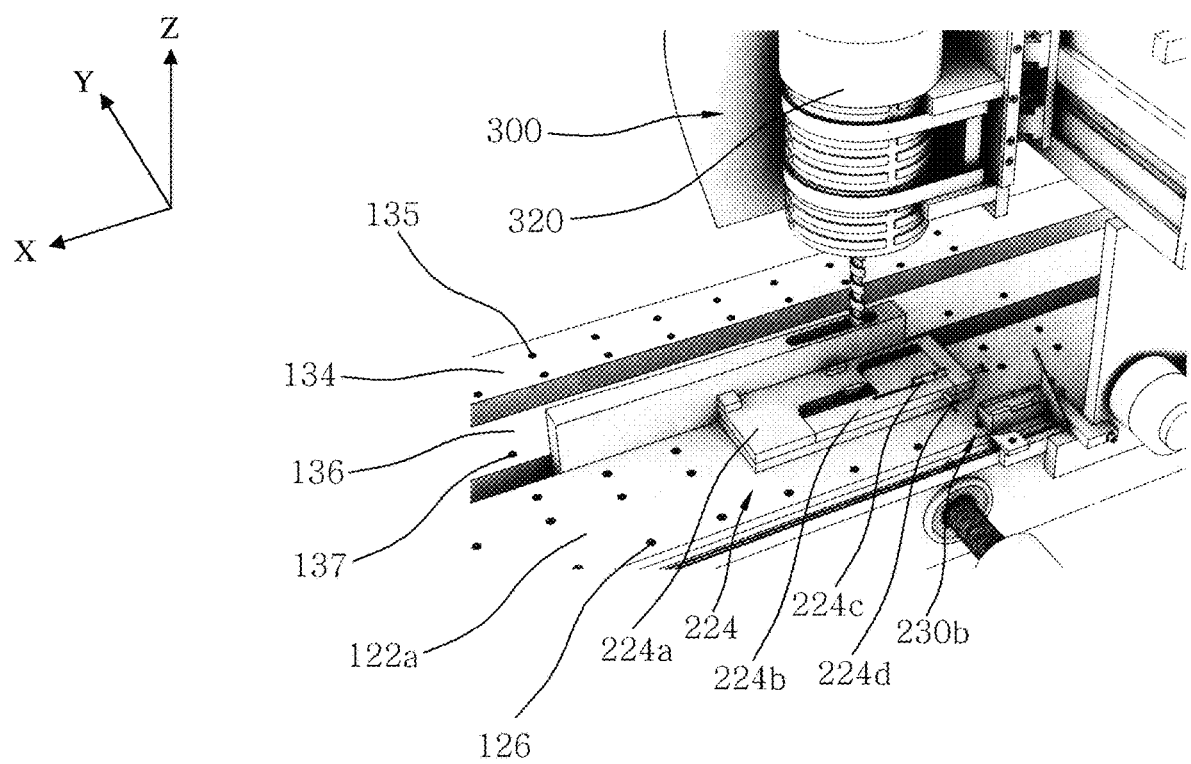
FIGS. 11a and 11b are views showing an example of a jig for fabricating a concave-convex structure for forming round grooves and round joints in accordance with a second embodiment of the present invention.
Figure 11B:
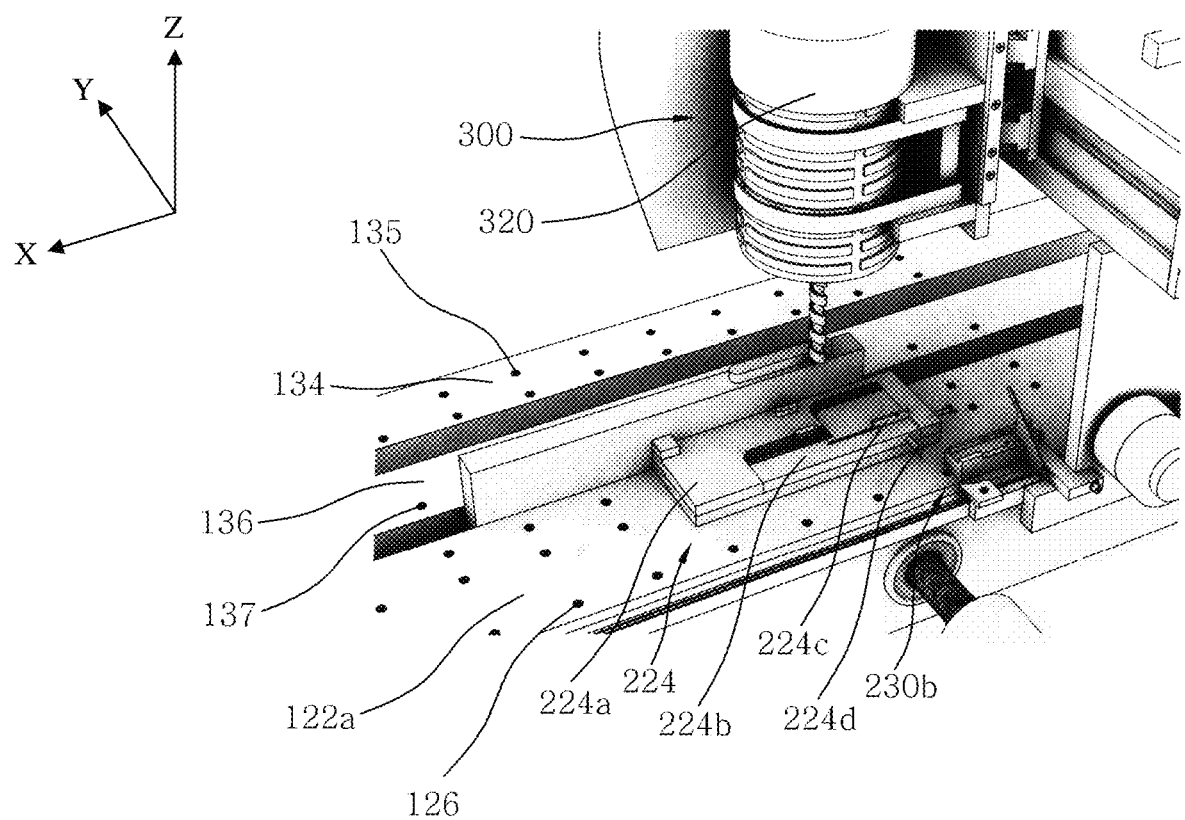
Figure 12A:
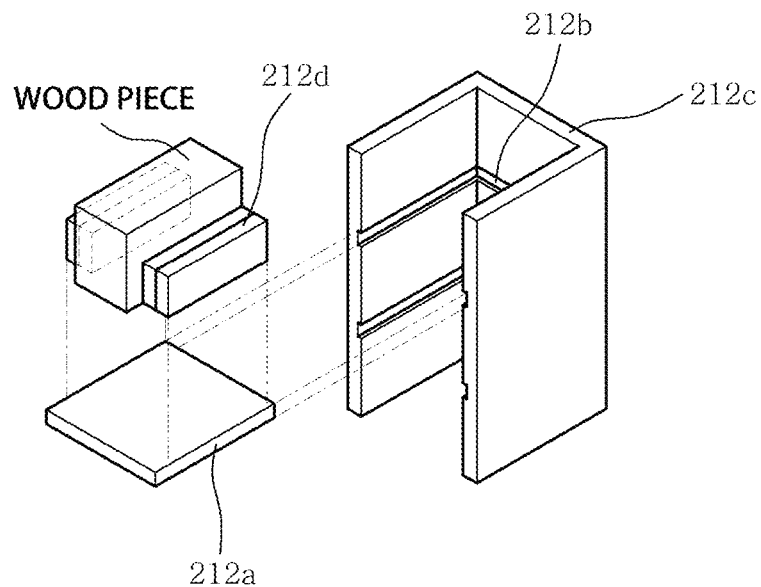
FIGS. 12a to 12c are views showing an example of a jig for fabricating a concave-convex structure for forming rectangular joints in accordance with a third embodiment of the present invention.
Figure 12B:
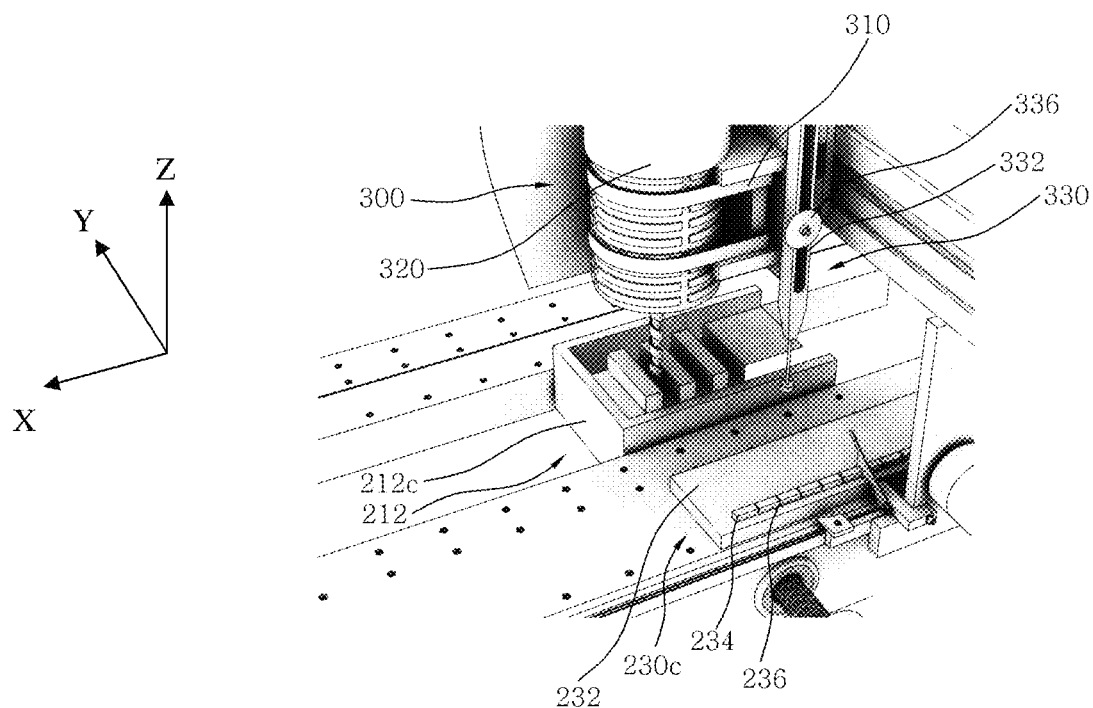
Figure 12C:
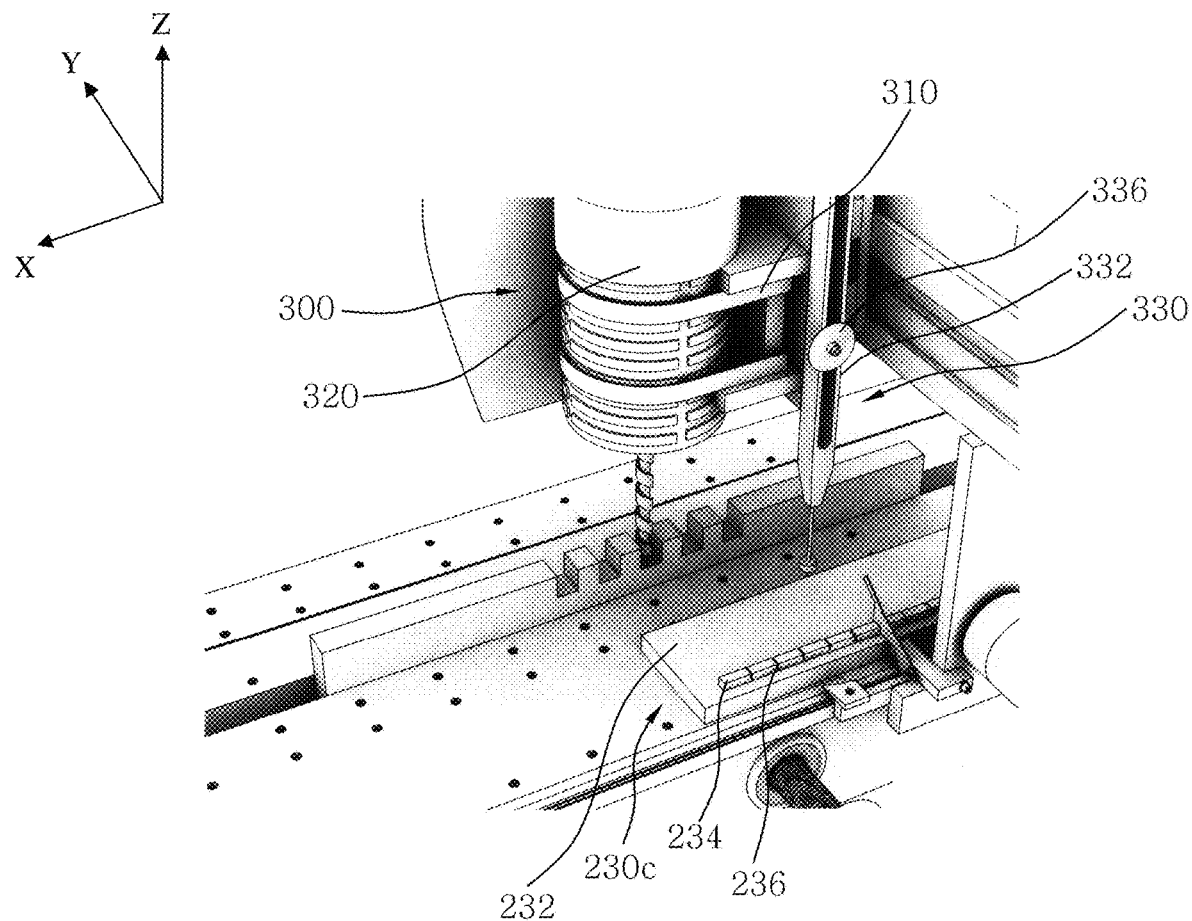
Figure 13A:
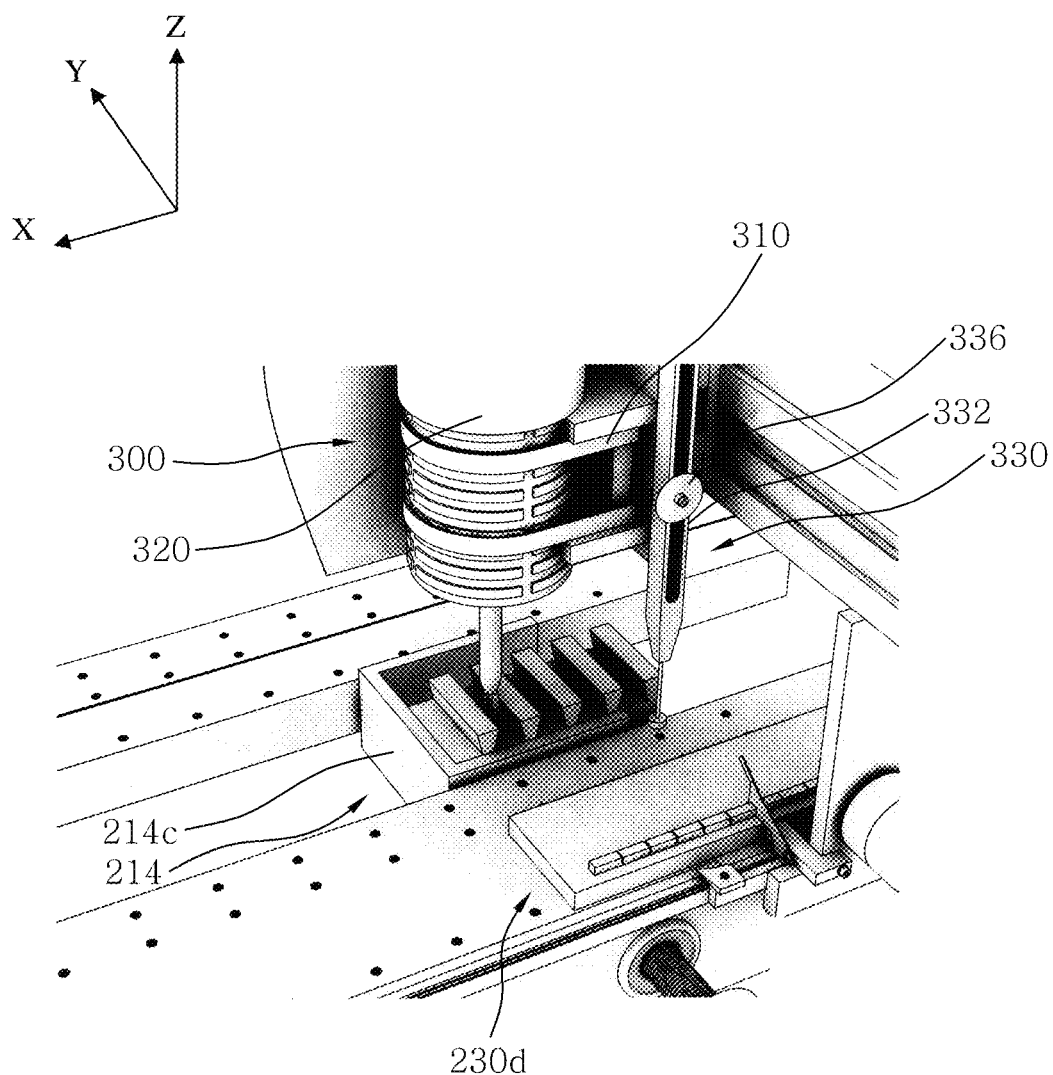
FIGS. 13a and 13b are views showing an example of a jig for fabricating a concave-convex structure for forming dovetail joints in accordance with a fourth embodiment of the present invention.
Figure 13B:
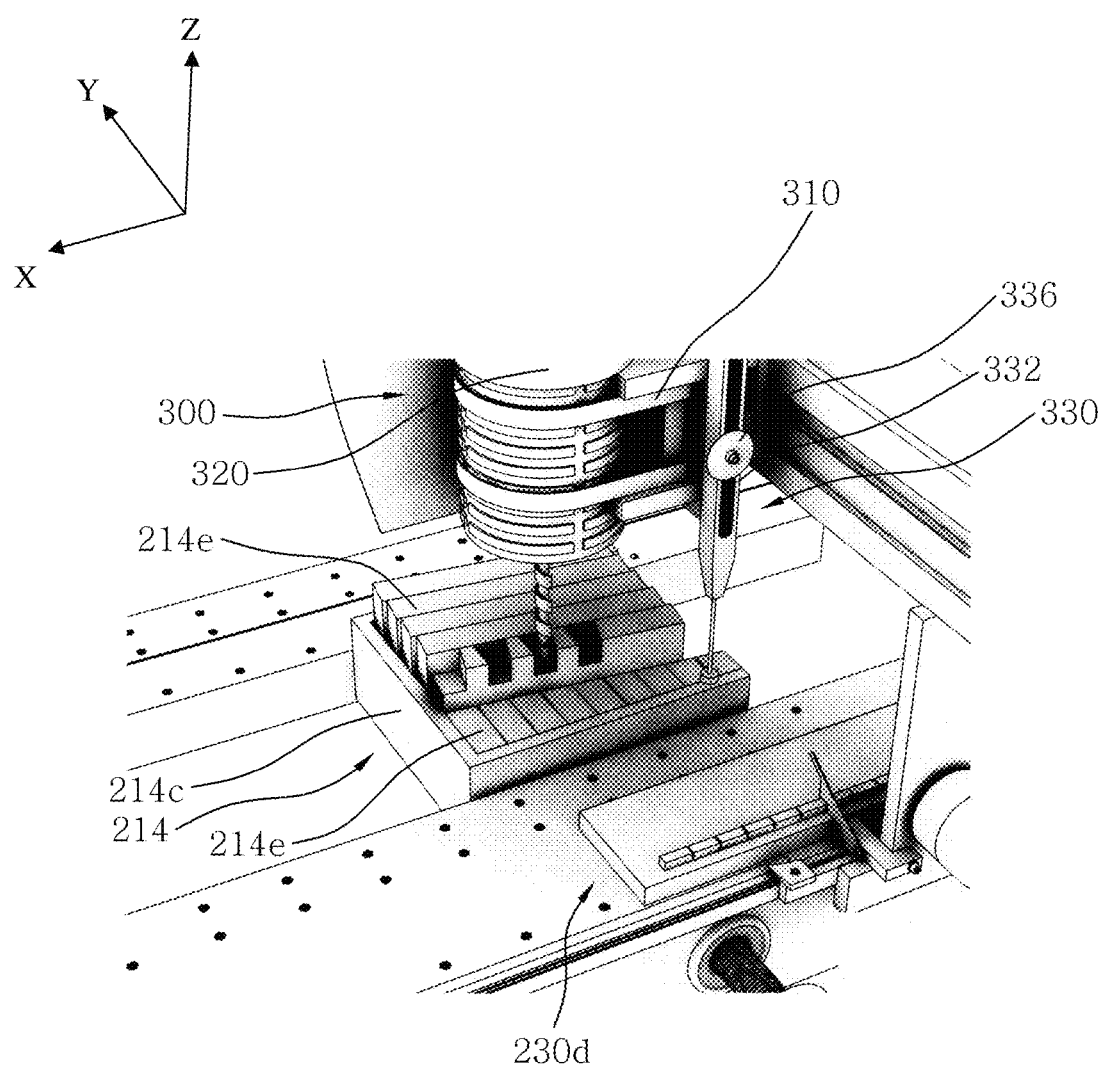
Figure 14A:
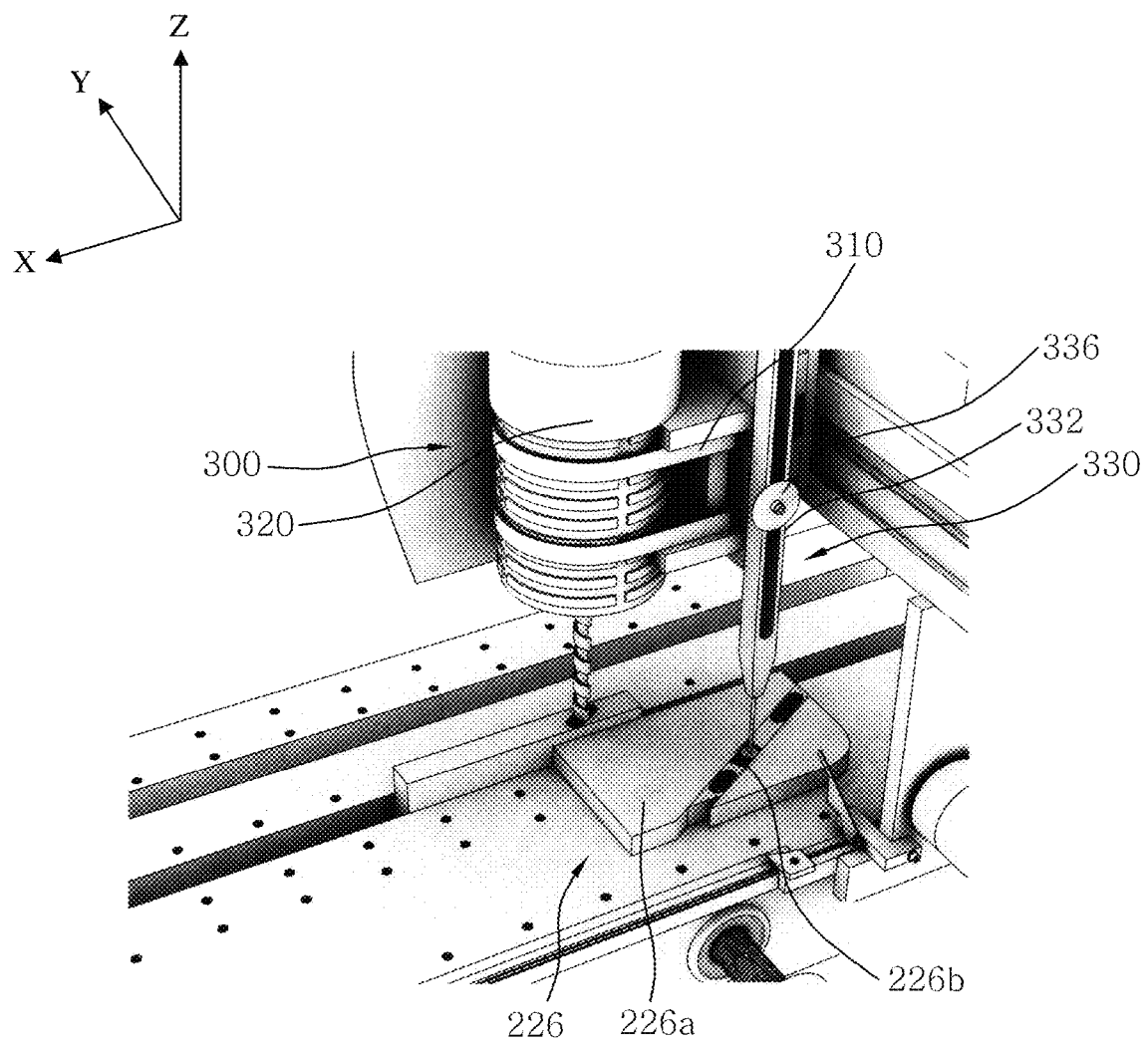
FIGS. 14a and 14b are views showing an example of a jig for fabricating a concave-convex structure for forming gallery grooves in accordance with a fifth embodiment of the present invention.
Figure 14B:
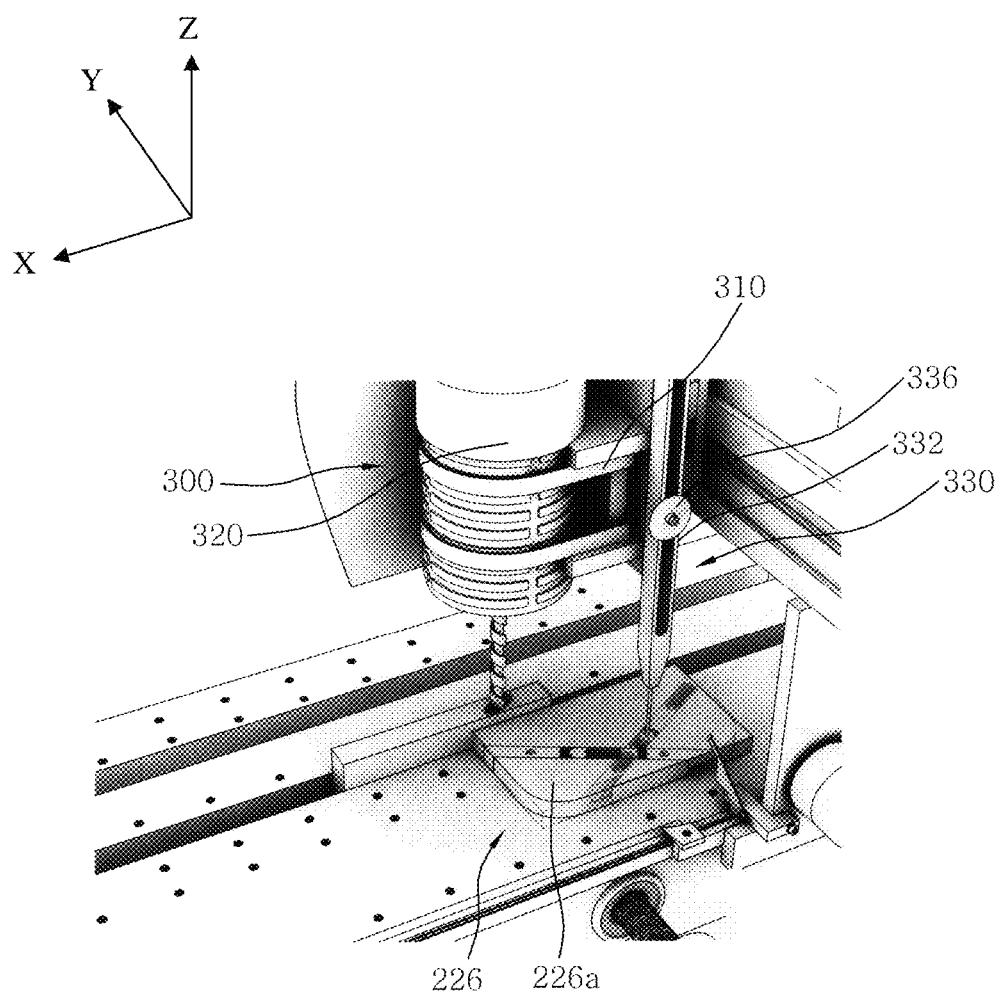
Figure 15:
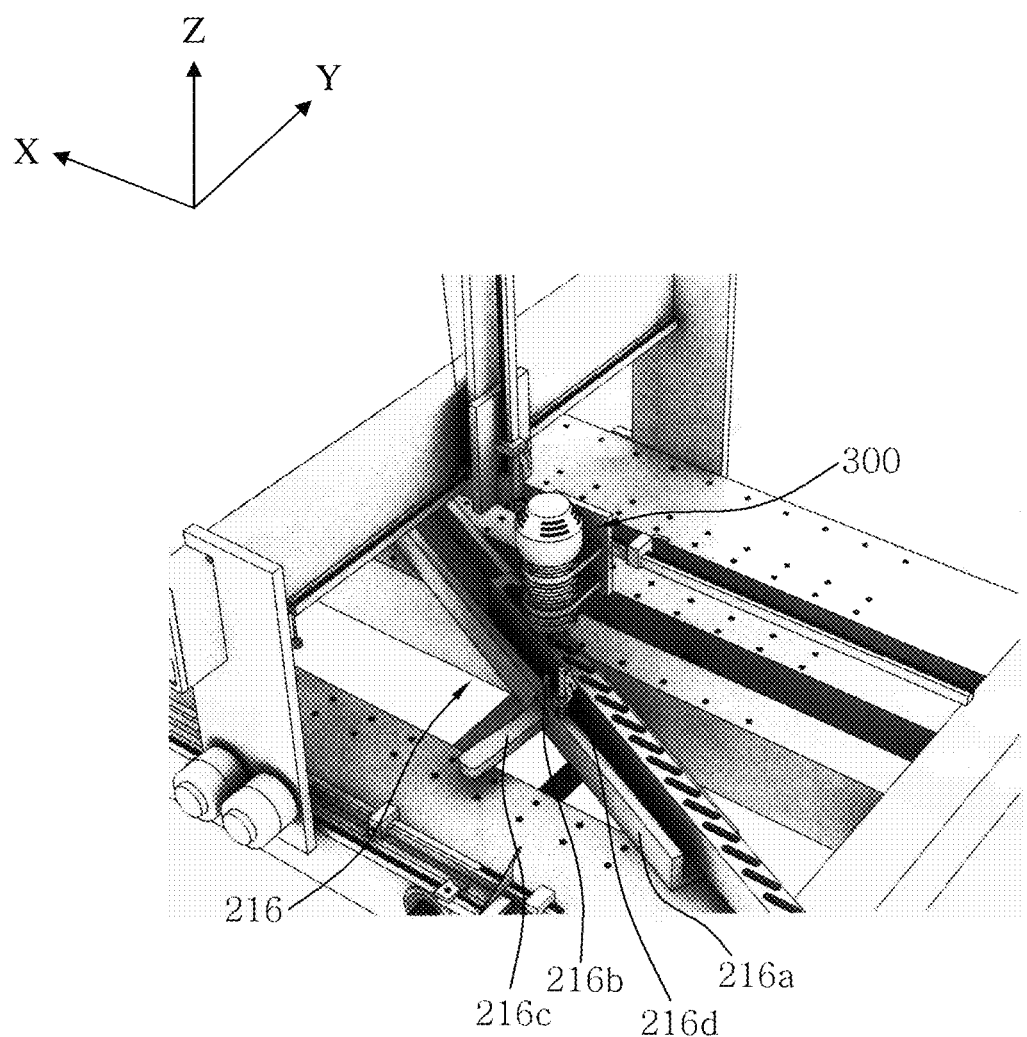
FIG. 15 is a view are views showing an example of a jig for fabricating a concave-convex structure for forming gallery grooves in accordance with a sixth embodiment of the present invention.

FIGS. 1 to 9 are views showing an example of a multi-purpose woodworking device to which a jig for fabricating a concave-convex structure according to an embodiment of the present invention is coupled. FIGS. 10a and 10b are views showing an example of a jig for fabricating a concave-convex structure for forming circular grooves and circular joints in accordance with a first embodiment of the present invention. FIGS. 11a and 11b are views showing an example of a jig for fabricating a concave-convex structure for forming round grooves and round joints in accordance with a second embodiment of the present invention. FIGS. 12a to 12c are views showing an example of a jig for fabricating a concave-convex structure for forming rectangular joints in accordance with a third embodiment of the present invention. FIGS. 13a and 13b are views showing an example of a jig for fabricating a concave-convex structure for forming dovetail joints in accordance with a fourth embodiment of the present invention. FIGS. 14a and 14b are views showing an example of a jig for fabricating a concave-convex structure for forming gallery grooves in accordance with a fifth embodiment of the present invention. FIGS. 15 and 14b are views showing an example of a jig for fabricating a concave-convex structure for forming gallery grooves in accordance with a fifth embodiment of the present invention. In embodiments of the present invention, it is assumed that an X-axial direction is the left-right direction of a woodworking work table 100, a Y-axial direction is the front-rear direction of the woodworking work table 100, and a Z-axial direction of the up-down direction of the woodworking work table 100.

Referring to FIGS. 1 to 9, 10a and 10b, 11a and 11b, 12a to 12c, 13a and 13b, 14a and 14b, and 15a and 15b, a multipurpose woodworking device to which a jig for fabricating a concave-convex structure according to an embodiment of the present invention is coupled may include a woodworking work table 100, a jig 200 for fabricating a concave-convex structure, and a router 300. The reference numeral of the jig 200 for fabricating a concave-convex structure is not shown in the figures, but it is provided for clearly describing the present invention. Furthermore, the jig is a term including a plurality of jigs having various functions and should be construed, depending on the following description of the present invention.

The woodworking work table 100, which is a table for woodworking, may include a support post 110, a base frame member 120, a vise member 130, a slider 140, a feeding device 150, a dimension guide 160, and a wood piece support 170.

The support post 110, which is installed at a predetermined height (e.g., around the waist of a person) for easy woodworking on the woodworking work table 100 and supports the components of the woodworking work table 100, may include vertical posts 112, horizontal posts 114, and height adjusters 116.

The vertical posts 112 are made of circular or polygonal timbers and four vertical posts are provided to support the components of the woodworking work table 100. The horizontal post 114 are horizontally coupled and fixed to the vertical posts 112 to assist the vertical ports 112 to support the components. The height adjusters 116 are coupled by bolting etc. and are rotated forward or backward to be able to move up or down the woodworking work table 100 by about 15-30 mm.

The height adjusters 116 are disposed on the bottoms of the vertical posts 112, so horizontality of the woodworking work table 100 regardless of the slope of the floor by adjusting the heights of the vertical posts 112 on the basis of a level.

As described above, a plurality of storage holes is formed to keep a plurality of end mills that are coupled to a woodworking machine and can perform ramping, side cutting, pocketing, and helical milling etc., so it is possible to not only easily keep a plurality of end mills, but easily replace and mount the end mills for various wood piecework operations.

The base frame member 120, which is a framework supported by the support post 110, may include a front/rear base frame 122, a lateral guide groove 123, a left/right base frame 124, a fixing slide 125, first jig-coupling grooves 126, sub-coupling grooves 127, and a through-hole (not shown).

The front/rear base frame 122 and the left/right base frame 124 form a rectangular framework for the woodworking table 100 and the through-hole is formed through the inner side and the outer side of a front base frame 122a of the front and rear base frames 122, so a moving screw 132 of vise member 130 is disposed through the through-hole.

The front/rear base frame 122 includes a front base frame 122a and a rear base frame 122b and is horizontally supported by the vertical supports 112 of the support post 110. A ball bearing may be disposed at the front base frame 122a to prevent forward/rearward movement by rotation of the moving screw 132 and the first jig-coupling grooves 126 in which a woodworking jig for fabricating wood pieces may be formed at the top and the inner sides.

At least one first jig-coupling groove 126 may be arranged with predetermined intervals (e.g., 50 mm and 100 mm) in the front-rear direction on the top and the inner sides of the front base frame 122 and at least one first jig-coupling groove 126 may be arranged with predetermined intervals (e.g., 50 mm and 100 mm) in the left-right direction. Obviously, the first jig-coupling grooves 126 may be arranged with different intervals (e.g., 50 mm and 100 mm) in the front-rear direction or the left-right direction.

Furthermore, the left-right guide grooves 123 for left-right guiding may be formed on the front base frame 122a and the fixing slide 125 can move on the left-right guide groove 123 and can be fixed at finely controlled positions by a fixing member such as a screw or a bolt.

The sub-coupling grooves 127 are formed on the top of the fixing slide 125 to fix a woodworking jig and the fixing slide is fixed at finely controlled positions by a fixing member such as a screw or a bolt, whereby the woodworking jig coupled to the grooves can be finely adjusted.

The vise member 130, which is coupled to the base frame member 120 at the front and rear ends to fix a wood piece to be fabricated, may include the moving screw 132, a moving vise 134, a free vise 136, and a vise handle 138.

In the moving screw 132, a first end is rotatably coupled to the rear base frame 122b of the front/rear base frame 122 of the base frame member 120 and a second end passes through a through-hole (not shown) formed at the front base frame 122a, and the moving screw 132 can be rotated by the vise handle 138 to be described below. At least one moving screw 132 may be disposed at the center of an X-axis in the front-rear direction and one or more circular assistant moving bars are spaced from the moving screw, so a wood piece can be stably moved and fixed by the vise member 130.

The moving vise 134 is moved forward or rearward (forward or backward) by rotation of the moving screw 132 and may be engaged with threads on the outer side of the moving screw 132.

The free vise 136 can be freely moved forward or rearward by forward/rearward movement of the moving vise 134 by rotation of the moving screw 132. A ball bearing may be disposed on the free vise 136 not to move forward/rearward due to rotation of the moving screw 132.

A second jig-coupling groove 135 in which a woodworking jig for fabricating wood pieces is coupled may be formed on the top and the sides of the moving vise 134 and a third jig-coupling groove 137 in which a woodworking jig for fabricating wood pieces is coupled may be formed on the top and the sides of the free vise 136.

One or more second jig-coupling groove 135 and one or more third jig-coupling grooves 137 may be arranged with regular intervals in the front-rear direction on the tops and sides and one or more second and third jig-coupling grooves may be arranged with regular intervals in the left-right direction. Obviously, the second jig-coupling grooves 135 and the third jig-coupling grooves 137 may each be arranged with different intervals in the front-rear direction or the left-right direction, if necessary.

The vise handle 138, which is provided to rotate the moving screw 132, may include a handle block 138a fixed to the second end of the moving screw 132, a handle 138b laterally disposed through the handle block 138a and being able to rotate the vise handle 138, and a ball bearing 138c disposed at the portion passing through the front base frame 122a for smooth rotation of the moving screw 132.

The handle 138b has a bar shape exposed to the outside through the handle block 138a and has locking steps at both ends not to separate from the handle block 138a, so it can be protruded to any side to rotate the vise handle 138.

In an embodiment of the present invention described above, although one moving screw 132 and one vise handle 138 are disposed at the center and at least one assistant moving bars 133 are provided, two moving screws 132 and two vise handles 138 may be provided at the position of the assistant moving bar 133 and the moving screws 132 may be linked by a change or a gear so that one of the moving screws 132 is rotated, the other moving screw 132 can also be rotated.

Accordingly, since two moving screws 132 are rotated in the same way, the moving vise 134 and the free vise 136 are moved in the same way, so it is possible to stably fix a wood piece to be fabricated by applying the same force in a Y-axial direction (e.g., forward) of the woodworking work table 100.

A plurality of moving screws 132, assistant moving bars 133, and vise handles 138 may be combined, if necessary, for stable movement of the moving vises 134 and the free vises 136 and for stable fixing of wood pieces.

Meanwhile, in the front base frame 122a and the rear base frame 122b of the front/rear base frame 122 of the base frame member 120 described above, when horizontally seen, protrusive portions that protrudes a predetermined length in the X-axial direction may be formed at the upper end of the rear side of the front base frame 122*a* and at the upper end of the front side of the rear base frame 122*b*, and first jig-coupling grooves 126 may be formed on the protrusive portions.

Furthermore, in the moving vise 134 and the free vise 136 of the vise member 130, protrusive portions that protrude a predetermined length in the X-axial direction, when horizontally seen, may also be formed at the front portion and the rear portion of the tops, and second jig-coupling grooves 135 and third jig-coupling grooves 137 may also be formed respectively on the protrusive portions.

There is high possibility that wood pieces to be fabricated have non-uniform surfaces in the longitudinal direction (that is, in the X-axial direction), so the protrusive portions can firmly and stably fix the non-uniform wood pieces in the longitudinal direction (that is, in the X-axial direction) on sides of the wood pieces.

Figure 4A:
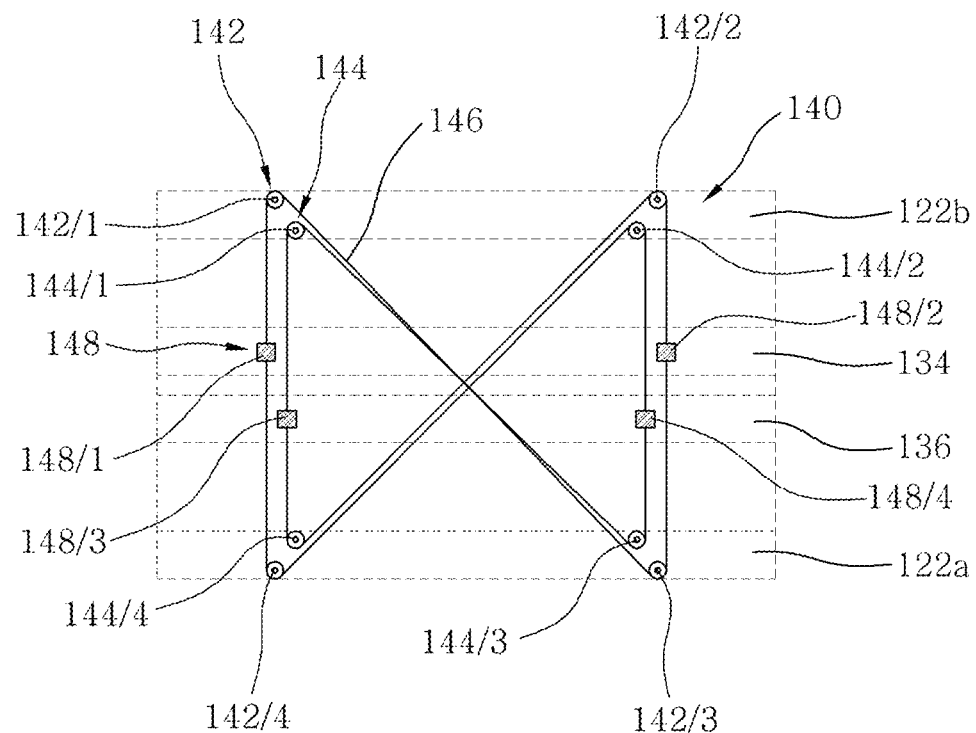

The slider 140 is disposed under the base frame member 120 and the vise frame member 130 to slide the vise member 130 in the front-rear direction (that is, in the Y-axial direction), and, as shown in FIG. 4*a*, may include a plurality of outer rollers 142 and a plurality of inner rollers 144 disposed under the front/rear base frame 122 of the base frame member 120, connecting wires 146 disposed on the outer rollers 142 and the inner rollers 144, and a plurality of holders 148 disposed under the moving vise 134 and the free vise 136 of the vise member 130 and fixing the connecting wires 146.

For example, the outer rollers 142 include, clockwise from the left upper portion, a first outer roller 142/1, a second roller 142/2, a third roller 142/3, and a fourth outer roller 142/4. The inner rollers 144 include, clockwise from the left upper portion, a first inner roller 144/1, a second inner roller 144/2, a third inner roller 144/3, and a fourth inner roller 144/4. The holders 148 include, on the connecting wire 146 extending from the inner roller 144, a first holder 148/1 and a second holder 148/2 from the left side under the moving vise 134 and a third holder 148/3 and a fourth holder 148/4 from the left side under the free vise 136. In the connecting wire 146 extending in this way, the connecting wire 146 extending from the first outer roller 142/1 of the outer rollers 142 may be wound around the third outer roller 142/3 positioned diagonally, fixed to the moving vise 134 by the second holder 148/2, and then extended to the second outer roller 142/2 positioned straight.

The connecting wire 146 wound around the second outer roller 142/2 may extend to the fourth inner roller 144/4, which is positioned diagonally, of the inner rollers 144, the connecting wire 146 wound around the fourth inner roller 144/4 may be fixed to the free vise 136 by the third holder 148/3 and extended to the first inner roller 144/1, and the connecting wire 146 wound around the first inner roller 144/1 may be extend to the third inner roller 144/3 positioned diagonally.

Furthermore, the connecting wire 146 wound around the third inner roller 144/3 may be fixed to the free vise 136 by the fourth holder 148/4 and then extended to the second inner roller 144/2, the connecting wire 146 wound around the second inner roller 144/2 may extend to the fourth outer roller 142/4 positioned diagonally, and the connecting wire 146 wound around the fourth outer roller 142/4 may be fixed to the moving vise 134 by the first holder 148/1 and then extended to the first outer roller 142/1 positioned straight and connected to the initial connecting wire 146. Accordingly, the moving vise 134 and the free vise 136 of the vise member 130 can be smoothly slid with respect to the front/rear base frame 122 of the base frame member 120.

Figure 4B:
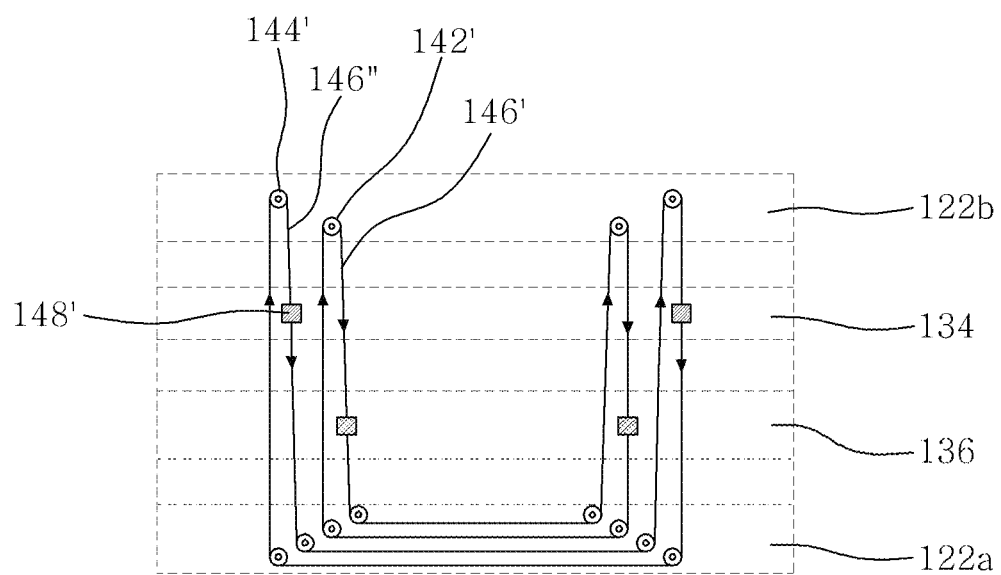
Figure 5:
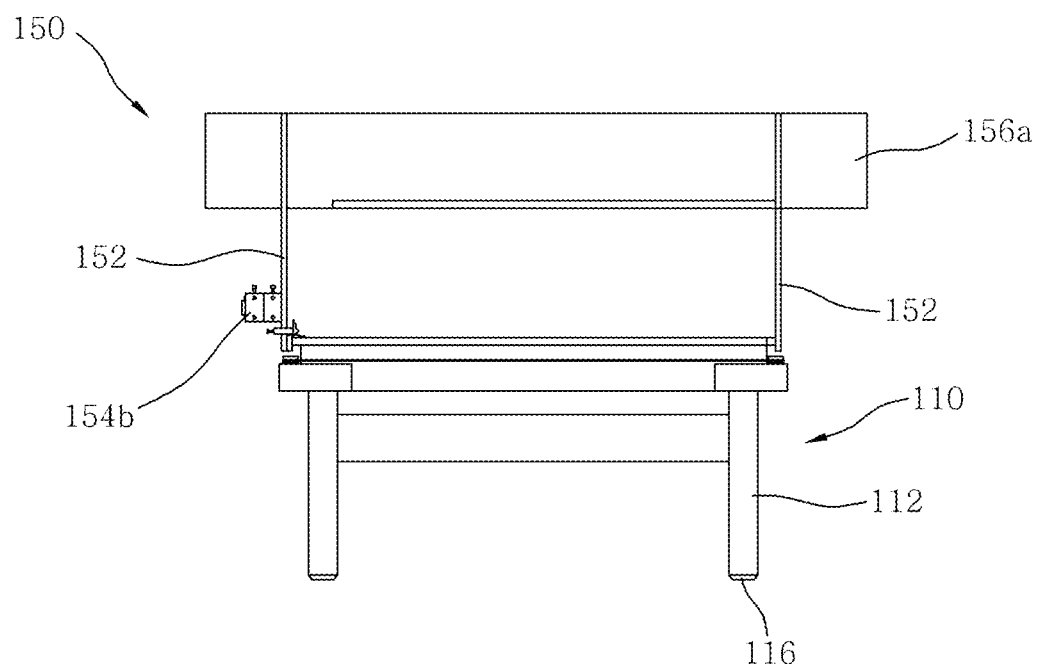
Figure 6:
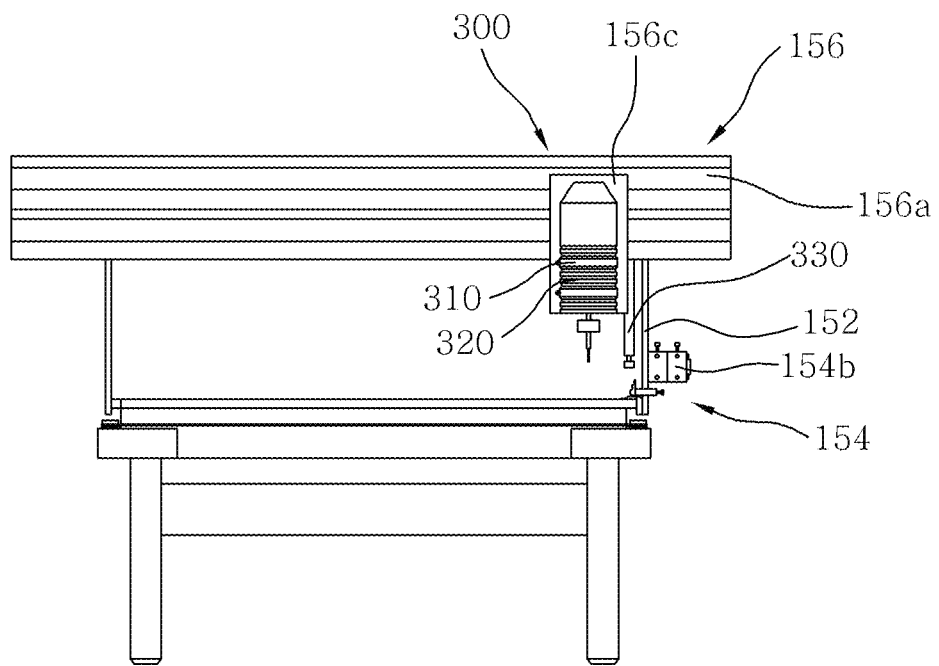
Figure 7:
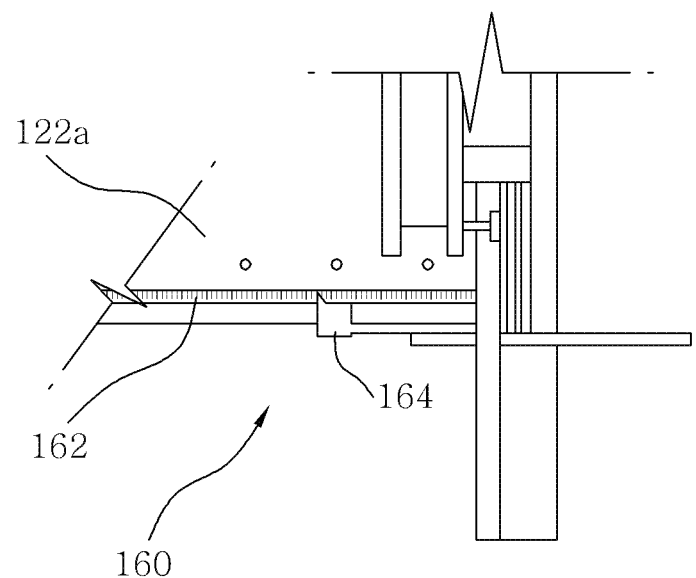
Figure 8:
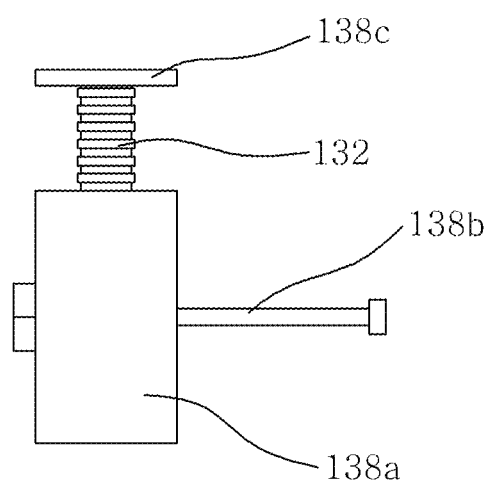
Figure 9:
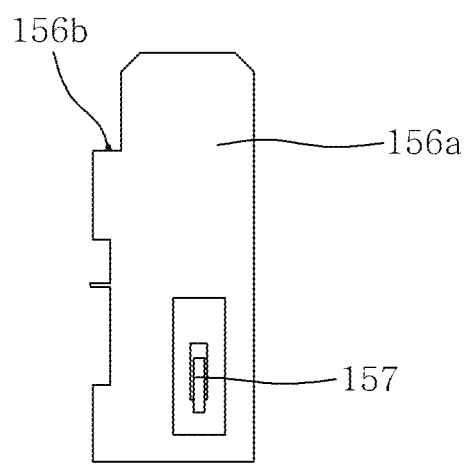

The sliding device 146 having the structure described above can easily slide with a simple configuration, but there is high possibility that when various woodworking operations are performed on the woodworking work table 100, the woodworking operations may be interfered with from under the table. Accordingly, in order to solve this problem, the sliding device 140, as shown in FIG. 4*b*, may include a plurality of inner rollers 142', a plurality of outer rollers 144', an inner connecting wire 146', an outer connecting wire 146", and a plurality of holders 148'. Similar to the description referring to FIG. 4*a*, the moving vise 134 and the free vise 136 can be moved in the same direction by sliding inward and outward in the directions of arrows.

When the sliding device 140 is configured in this structure, wood pieces can be fabricated without interference from under the woodworking work table 100 when wood pieces are fabricated on the table.

The feeding device 150, which moves a woodworking machine (e.g., a cutter and a router) mounted on the base frame member 120 in X-axial, Y-axial, and Z-axial directions, may include base plates 152, an X-axial feeder 154, a Y-axial feeder 156, and a Z-axial feeder 158.

The base plates 152 are rectangular plates vertically erected and disposed at front and rear sides to be moved in the X-axial direction (i.e., in the left-right direction) by the X-axial feeder 154, and may have the Y-axial feeder 156 and the Z-axial feeder 158.

A lock (not shown) fixing the base plate 152 to prevent X-axial direction may be provided at the joint between the base plate 152 and the base frame member 120. The lock can be locked and unlocked by turning a lock handle thread-fastened through the base plates 152.

The X-axial feeder 154, which moves the base plates 152 in the X-axial direction (i.e., in the left-right direction) may include X-axial rails 154*a* disposed in the left-right directions on the front/rear base frame 122 of the base frame member 120, X-axial rail grooves (not shown) formed in the left-right direction on the top of the X-axial rails 154*a*, and a ball bearing-typed fixed block 154*b* disposed on the side of the lower portion of at least one of the base plates 152 to function as a handle for moving the base plates 152 in the X-axial direction (i.e., in the left-right direction).

Grooves corresponding to the X-axial rail grooves are formed at the joints of the base plates 152, so even if a small force is applied to the fixed block 154*b*, the base plates 152 combined with the X-axial feeder 154 can be smoothly moved in the X-axial direction.

The Y-axial feeder 156 is mounted on the base plates 152 to be movable in the Y-axial direction (i.e., in the front-rear direction) to move in the Y-axial direction and may include a Y-axial base block 156*a* coupled to the upper ends of the base plates 152, an Y-axial rail 156*b* formed on the top of a protrusive coupling step on the inner side of the Y-axial base block 156*a*, and a Y-axial feeder block 156*c* fitted in the Y-axial rail 156*b* to move in the Y-axial direction (i.e., in the front-rear direction).

The Y-axial feeder 156 may have a switch 157 for operating a woodworking machine (e.g., a router) may be disposed on the Y-axial feeder 156, a Y-axial scale, a Y-axial indicator, and a Y-axial holder, so it can be firmly and stably moved and fixed at work positions.

The Z-axial feeder 158 is coupled to the Y-axial feeder 156 to be movable in the Z-axial direction (i.e., in the up-down direction) to move a mounted woodworking machine in the Z-axial direction may include a support plate 158a coupled to the Y-axial feeder block 156 of the Y-axial feeder 156 and a Z-axial feeder module (not shown) coupled to the support plate 158a to move a woodworking machine (e.g., a router) in the Z-axial direction.

The Z-axial feeder 158 has a Z-axial scale, a Z-axial indicator, and a Z-axial holder, so it is possible to adjust the Z-axial position of a woodworking machine and fix the woodworking machine at the position.

The Z-axial feeder module can be moved by hydraulic pressure, pneumatic pressure, a screw, or a rail, and this mechanism is well known in the art, so it is not described in detail.

The X-axial feeder 154 may include a plurality of side rollers and a sliding wire B connecting the side rollers to be able to easily move to the same positions in the X-axial direction from the front ends and rear ends of the base plates 152 even if a small force is applied to the fixed block 154b. The side rollers may be disposed on the outer side of the base frame member 120.

For example, as shown in FIG. 7c, a plurality of side rollers may be disposed at each of four corners of the sides of the base frame member 120. In the figure, a first side roller A1, a second side roller A2, a third side roller A3, and a fourth side roller A5 may be disposed respectively at the corners clockwise from the left upper corner. A fifth side roller A5, a sixth side roller A6, a seventh side roller A7, and an eighth side roller A8 are disposed clockwise from the left upper portion of the front. A first holder S1 is disposed on a sliding wire B extending between the first side roller A1 and the second side roller A2 and a second holder S2 is disposed on a connecting wire B extending between the fifth side roller A5 and the sixth side roller A6. Accordingly, the base plates 152 fixed to the sliding wires B by the first holder S1 and the second holder S2 can be uniformly moved in the X-axial direction through the sliding wires B moving to the same position in the directions of arrows from the front end to the rear end.

The dimension guide 160 is disposed on the feeding device 150 to guide a woodworking dimension in the X-axial direction (i.e., in the left-right direction) and may include scales 162 marked longitudinally (i.e., in the left-right direction) on the X-axial rails 154a, indicators 164 disposed on the base plates 152 and indicating the scales 162 to fit to a woodworking dimension, and stoppers 166 maintaining the indicators 164 at an adjusted position using a woodworking jig.

The scale 162 can have various units, if necessary, such as centimeter, millimeter, and inch, and the indicator 164 can be stretched a predetermined distance longitudinally inward from an end of the base plate 152, depending on the position to indicate and the position of a woodworking machine.

The stopper 166 includes a stopper holder 166a disposed on the front base plate of the base plates 152 of the feeding device 150 and a stopper member 166b rotatably coupled to the stopper holder 166a and rotating about the X-axis, so it can allow the feeding device 150 to move within a woodworking area in the X-axial direction (i.e., in the left-right direction), using the stopper member 166b.

The wood piece support 170 is disposed under the rear side of the base frame member 120 and functions as a support for supporting a wood piece to be fabricated at an adjusted height. As shown in FIG. 7b, the wood piece support 170 may include a wood piece support plate 171 disposed under the rear side of the front base frame 122a of the front/rear base frame 122 of the base frame member 120, a height scale 172 indicating the height of a wood piece to be adjusted on the wood piece support plate 171, a height adjustment guide hole 173 vertically formed through the wood piece support plate 171, a wood piece support member 174 vertically moving up/down along the height adjustment guide hole 173, and a wood piece support holder 175 fixing the wood piece support member 174 on the wood piece support plate 171.

The wood piece support 170 may be disposed under the protrusive portion that protrudes at the upper end of the rear side of the front base frame 122a described above.

A plurality of jigs 200 for fabricating concave-convex structure is provided to form a plurality of concave-convex structures (e.g., circular, round, rectangular, dovetail, and gallery grooves and joints). The jigs are coupled to the woodworking work table 100 to guide wood pieces to be fabricated and may include a wood piece support jig, a shaping guide jig, and a stopper jig 230. The jigs 200 may be independently or simultaneously used.

The wood piece support jig, which is a jig mounted on the woodworking work table 100 and supporting or fixing a wood piece to be fabricated, is coupled to the tops or the inner sides of the front/rear base frame 122, the moving vise 134, and the free vise 136 at the position of a wood piece to be fabricated and can stably support the wood piece on a side or the bottom.

The wood piece support jig may include a rectangular tail-forming support jig 212, a dovetail-forming support jig 214, and a gallery groove-forming support jig 216.

The rectangular tail-forming support jig 212, as shown in FIGS. 12a and 12b, may include a rectangular wood piece support plate 212a, a jig body 212c having a rectangular shape with open top and bottom and an open side and having a recessed seat 212b for insertion of the wood piece support plate 212a, and assistant blocks 212d that are attached to both sides of a wood piece to fix a wood piece seated on the wood piece support plate 212a.

The rectangular tail-forming support jig 212 can firmly fix a wood piece by putting several assistant blocks 212d on both sides of a wood piece, depending on the thickness of a wood piece to be fabricated and the assistant blocks 212d have a height smaller than the depth of rectangular joints not to be interfered when rectangular joints are formed.

In an embodiment of the present invention described above, the rectangular tail-forming support jig 212 is used for rectangular tail forming, but as shown in FIG. 12c, it is possible to form rectangular joints using only a rectangular tail-forming stopper jig 230a of the stopper jig 230 to be described below even without using the rectangular tail-forming support jig 212.

Figure 13C:
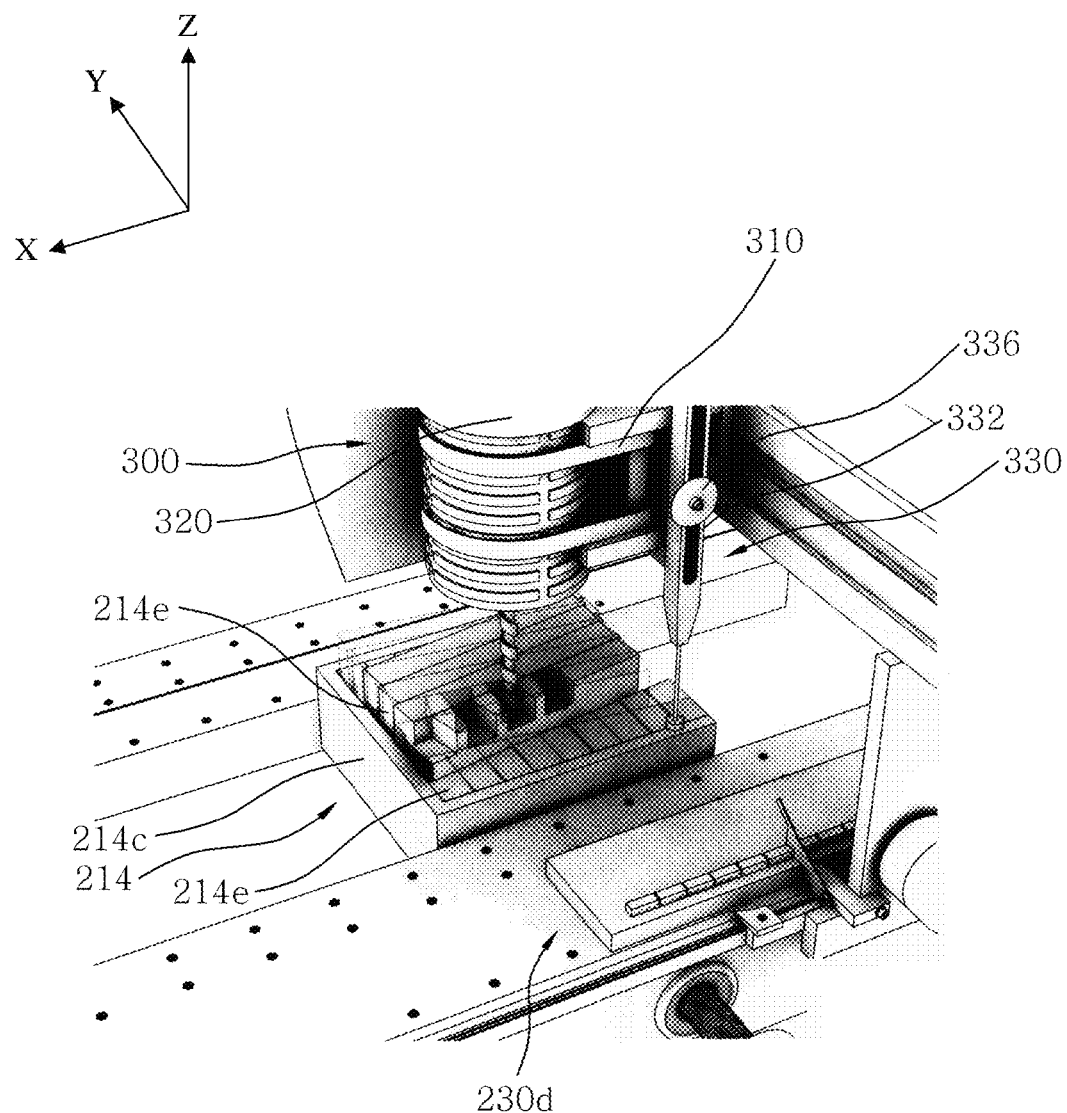

The dovetail-forming support jig 214, as shown in FIGS. 13a to 13c, may include a rectangular wood piece support plate (not shown, the same as 212a), a jig body 214c having a rectangular shape with open top and bottom and an open side and having a recessed seat (not shown, the same as 212b) for insertion of the wood piece support plate, first assistant blocks (not shown, the same as 212d) that are attached to both sides of a first wood piece, and second assistant blocks 214e that are attached to both sides of a second wood piece to be coupled to the first wood piece in order to obliquely fix the second wood piece.

According to the dovetail-forming support jig 214, it is possible to form dovetail joints on a side of a first wood piece after firmly fixing the first wood piece by attaching the first assistant blocks to both sides of the first wood piece, depending on the thickness of a wood piece to be fabricated. Furthermore, it is possible to form dovetail joints on a second wood piece corresponding to the first wood piece after firmly and obliquely fixing the second wood piece by attaching the second assistant blocks 214e to both sides of the second wood piece.

The first assistant blocks and the second assistant blocks 214e may have a height smaller than the depth of dovetail joints not to be interfered when dovetail joints are formed.

In woodworking for forming dovetail joints using the dovetail-forming support jig 214 described above, the X-axial position can be fixed by fixing the dovetail-forming support jig 214 between the front base frame 122a and the free vise 136 with an end mill for dovetail mounted on a router 300, fixing a first wood piece inside the dovetail-forming support jig 214 using the first assistant blocks, and then inserting the stopper member 166b in the first groove at the start position of interval grooves 236 of the dovetail stopper jig 230d to be described below.

Furthermore, it is possible to form a plurality of dovetails on the first wood piece by forming a first side of a first dovetail by moving the router 300 forward and rearward with respect to the first wood piece fixed inside the dovetail-forming support jig 214, with the router 300 adjusted in Z-axial (i.e., up-down) position and fixed at the position by the Z-axial feeder 158; by simultaneously forming a second side of the first dovetail and a first side of a second dovetail after turning and pulling the stopper member 166b out of the first groove and then inserting it into the next groove of the interval grooves 236; and then by repeatedly simultaneously forming a first side of a foregoing dovetail and a second side of the next dovetail.

Next, in woodworking for forming dovetail s that are vertically fitted to the first wood piece on the second wood piece, the X-axial position can be fixed by fixing the dovetail-forming support jig 214 between the front base frame 122a and the free vise 136 with the dovetail end mill separated from the router 300 and replaced with a straight end mill, by fixing the second wood piece inside the dovetail-forming support jig 214 obliquely in a first direction (i.e., in one direction) using the second assistant blocks 214e, and then inserting the stopper member 166b in the first groove of the interval grooves 236 of the dovetail stopper jig 230d to be described below.

Furthermore, it is possible to form first sides of dovetails on the second wood piece; by forming a first side of a first pin by moving the router 300 forward and rearward with respect to the second wood piece fixed inside the dovetail-forming support jig 214, with the router 300 adjusted in Z-axial (i.e., up-down) position and fixed at the position by the Z-axial feeder 158; and then by repeatedly forming a first side of a second pin after turning and pulling the stopper member 166b out of the first groove and then inserting it into the next groove of the interval grooves 236.

Next, it is possible to form second sides of the dovetail s on the second wood piece by repeatedly forming this process after inserting the second wood piece in the opposite direction inside the dovetail-forming support jig 215 and then fixing the second wood piece obliquely in a second direction (i.e., in the other direction) inside the dovetail-forming support jig 214 using the second assistant blocks 241e.

The gallery groove-forming support jig 216, as shown in FIG. 15, may include a rectangular jig body 216a longitudinally elongated and having open top and sides, a wood piece holder 216c disposed through the front side of the jig body 216a to fix a wood piece inserted inside the jig body 216a and fixing the wood piece by being rotated about a rotational shaft rod 216b, and a position indicator 216d for indicating positions where desired gallery grooves are formed.

In woodworking for forming gallery grooves using the gallery groove-forming support jig 216, it is possible to form gallery grooves on a wood piece by obliquely coupling and mounting the gallery groove-forming support jig 216 (e.g., obliquely at an angle corresponding to the gallery grooves to be fabricated), using the first jig-coupling grooves 126, the second jig-coupling grooves 135, and the third jig-coupling grooves 137 formed on the front base frame 122a, the rear base frame 122b, the moving vise 134, and the free vise 136; by inserting a wood piece to be fabricated into the gallery groove-forming support jig 216; fixing the wood piece by turning the wood piece holder 216 with the fabrication position maintained with reference to the position indicator 216c; by fixing the router 300 in the Y-axial direction; and by moving the router 300 left and right with respect to the woodworking work table 100 by the gaps of the gallery grooves with the X-axial and Z-axial positions of the router 300 maintained.

Further, in order to form gallery grooves having opposite slopes, it is possible to easily form the gallery grooves having opposite slopes by coupling and mounting the gallery groove-forming support jig 216 in the opposite direction, using the first jig-coupling grooves 126, the second jig-coupling grooves 135, and the third jig-coupling grooves 137 formed on the front base frame 122a, the rear base frame 122b, the moving vise 134, and the free vise 136.

The shaping guide jig, which is a jig guiding wood pieces to be able to form shapes corresponding to a plurality of woodworking operations, may include a circle-forming guide jig 222, a rounding guide jig 224, and a gallery groove-forming guide jig 226.

The circle-forming guide jig 222, as shown in FIGS. 10a and 10b, may include a guide jig body 222a having a rectangular block shape and inserted in a jig groove of the woodworking work table 100, and circular router guide portions 222b protruding from the top of the guide jig body 222a to guide a router guide 330 for the router 300.

The guide jig body 222a of the circle-forming guide jig 222 may have a fabrication position support plate 222c for supporting a wood piece to be fabricated at a fabrication position. When the circle-forming guide jig 222 is inserted in the woodworking work table 100, the guide jig body 222a is held on the upper front end (i.e., in the left-right direction) of the inner side of the front base frame 122a of the base frame member 120. Further, the fabrication position support plate 222c extends downward from the upper end of the inner side (i.e., the upper end of the rear side) of the guide jig body 222a, so it is possible to form circular grooves and circular joints while firmly and stably supporting a wood piece to be fabricated.

The location position support plate 222c is coupled to the upper end of the rear side of the guide jig body 222a to be movable to a fabrication position of a wood piece in the left-right direction (i.e., in the X-axial direction) together with the guide jig body, and it is vertically disposed to be able to vertically support a wood piece.

In woodworking for forming circular grooves and circular joints corresponding to the circular grooves using the circle-forming guide jig 222 described above, it is possible to form circular joints by coupling the circle-forming guide jig 222 to be aligned with the inner end of the top (i.e., the rear end of the top) of the front base frame 122a of the base frame member 120; by supporting a first wood piece on the circle-forming guide jig 222 and fixing the first wood piece with the base frame member 120 and the vise member 130; by forming circular grooves on the first wood piece by adjusting the X-axial position and the Z-axial position after adjusting the Y-axial position using the router 300 to be described below; by separating the first wood piece and then fixing a second wood piece at the same position; and by moving the router 300 along the router guide portions 222*b* while adjusting the X-axial position and the Y-axial position after adjusting the Z-axial position.

The rounding guide jig 224, as shown in FIGS. 11*a* and 11*b*, may include a guide jig body 224*a* formed in a rectangular block shape and inserted in the jig-coupling grooves of the woodworking work table 100, a guide block 224*b* having a router guide portion 224*c* protruding from the top of the guide jig body 224*a* to correspond to the shape of round joints and guiding the router guide 330 of the router 300, and guide adjusters 224*d* disposed on the guide block 224*b* in the X-axial direction and the Y-axial direction to finely adjust the X-axial position and the Y-axial position of round joints.

The guide jig body 224*a* of the rounding guide jig 224 may further have a fabrication location support plate for supporting the fabrication position of a wood piece to be fabricated. The fabrication position support plate has the same configuration and function as those of the fabrication position support plate 222*c* of the circle-forming guide jig 222, so it is not described in detail.

In woodworking for forming round grooves and round joints corresponding to the circular grooves using the rounding guide jig 224 described above, it is possible to form round joints by coupling the rounding guide jig 224 to be aligned with the inner end of the top (i.e., the rear end of the top) of the front base frame 122*a* of the base frame member 120; by supporting a first wood piece on the rounding guide jig 224 and fixing the first wood piece with the base frame member 120 and the vise member 130; by forming circular grooves on the first wood piece with reference to the dimension guide 160 by adjusting the X-axial position and the Z-axial position after adjusting the Y-axial position using the router 300 to be described below; by separating the first wood piece and then fixing a second wood piece at the same position; and by moving the router 300 along the router guide portion 224*c* while adjusting the X-axial position and the Y-axial position after adjusting the Z-axial position.

The gallery groove-forming guide jig 226, as shown in FIGS. 14*a* and 14*b*, may include a guide jig body 226*a* having a rectangular block shape and inserted in a jig groove of the woodworking work table 100, and a router guide groove 226*b* obliquely formed on the top of the guide jig body 226*a* to guide the router guide 330 of the router 300.

The slope of the router guide groove 226*b* may have the same angle as that of the slope of gallery grooves, the guide jig body 226*a* may further have a fabrication position support plate for supporting a fabrication position of a wood piece to be fabricated, and the fabrication position support plate has the same configuration and function as those of the fabrication position support plate 222*c* of the circle-forming guide jig 222, so it is not described in detail.

In woodworking for forming gallery grooves using the gallery groove-forming guide jig 226, it is possible to form gallery grooves having a predetermined slope at the portion of a wood piece where gallery grooves are formed: by fitting the gallery groove-forming guide jig 226 to the inner end of the top (i.e., the rear end of the top) of the front base frame 122*a*; by supporting a wood piece with the fabrication position support plate and fixing the wood piece between the front base frame 122*a* and the free vise 136; and by obliquely moving the router 300 at the slope of gallery grooves along a guide pin 334 moving in the router guide groove 226*b* with the Z-axial position (i.e., the up-down position) of the router 300 adjusted and fixed by the Z-axial feeder 158.

Meanwhile, in order to form gallery grooves having an opposite slope, it is possible to form the gallery grooves having an opposite slope by fitting the gallery groove-forming guide jig 226 to the inner end of the top (i.e., the rear end of the top) of the front base frame 122*a* in the opposite direction or mounting a gallery groove-forming guide jig having the opposite slope.

The stopper jig 230 is provided to maintain the X-axial movement (i.e., the left-right movement over the woodworking work table 100) of the router 300 disposed over the woodworking work table 100 to correspond to an operation of forming a concave-convex structure and may include a circle-forming stopper jig 230*a* shown in FIGS. 10*a* and 10*b*, a rounding stopper jig 230*b* shown in FIGS. 11*a* and 11*b*, a rectangular tail-forming stopper jig 230*c* shown in FIGS. 12*a* and 12*b*, and a dovetail-forming stopper jig 230*d* shown in FIGS. 13*a* and 13*b*.

The circle-forming stopper jig 230*a*, rounding stopper jig 230*b*, rectangular tail-forming stopper jig 230*c*, and dovetail-forming stopper jig 230*d* each include a stopper jig block 232 coupled to the top of the woodworking work table 100, close to the dimension guide 160, an interval groove plate 234 protruding from the top of the stopper jig block 232, and interval grooves 236 formed on the top of the interval groove plate 234 in accordance with intervals for woodworking. Accordingly, it is possible to move the stopper 166, which is inserted in the interval grooves 236, of the dimension guide 160 within the range of desired woodworking and it is also possible to easily adjust the fabrication intervals of a wood piece in accordance with the intervals between interval grooves 232.

The base plate 152 of the feeding device 150 with the router 300 mounted thereon can be prevented from moving out of the woodworking intervals in the X-axial direction, so woodworking can be performed in accordance with predetermined intervals.

For example, in circular joint fabrication and rectangular joint fabrication, it is possible to easily form circular joints and rectangular joints by repeating a process of forming a first joint end: by fixing a wood piece to be fabricated between the front base frame 122*a* and the free vise 136; by turning and inserting the stopper member 166*b* of the stopper 166 into the first groove of the interval grooves 236 formed with regular intervals; by adjusting the Z-axial position (i.e., the up-down position) of the router 300; and then by moving the router 300 to be described below in the front-rear direction of the woodworking work table 100 and a process of forming a second joint groove by inserting and fixing the stopper member 166*b* in the second groove of the interval grooves 236 and then moving the router 300 in the front-rear direction of the woodworking work table 100.

The router 300 is a woodworking machine for performing several woodworking operations (e.g., milling, dovetailing, forming of a dowel, and copying) and may include a router support 310 horizontally mounted by the support plate 158*a* of the Z-axial feeder 158 of the feeding device 150 to support the router 300, a router module 320 disposed on the router support 310 to perform woodworking, a router guide 330 disposed on a side of the front of the Z-axial feeder 158 to be guide to the shaping guide jig 222, 224 or 226 of the woodworking jig 200, and a router operator 340 operating the router module 320.

It is possible to selectively mount various-dimensional end mills for ramping, side cutting, pocketing, and helical milling etc. of a plurality end mills on the router module 320 and then perform corresponding woodworking operations (e.g., milling, molding, dovetailing, forming of a dowel, and copying).

The router guide 330 may include a guide body 332 vertically coupled to the support plate 158*a* of the Z-axial feeder 158 and extending downward, a guide pin 334 coupled to the bottom of the guide body 332 to be able to move up/down and rotate about the Z-axis, and a guide pin holder 336 fixing the guide pin 334 to the guide body 332 at a Z-axial fabrication position.

The guide pin 334 is guided by a guide 224 to be able to form various joints. When it is required to form a circular joint of 12 mm, the diameter of a circular plate at the end of the guide pin 334 can be adjusted so that the guide pin can be guided at a distance corresponding to the circular joint of 12 mm the from the guide 224.+

The router guide 330 described above vertically extends from the Z-axial feeder 158 in this embodiment, but it may horizontally extend after vertically extending down with an additional support block and an additional scale and may have the guide body 332 and the guide pin 334 of this embodiment of the present invention. Furthermore, the shape can be changed in various ways as long as it can be guided by the guide 224.

For example, woodworking that uses the router 300 described above is described. In milling of a wood piece, it is possible to fix a wood piece to be fabricated using the base frame member 120 and the vise member 130 on the woodworking work table 100. It is possible to firmly and stably fix a wood piece to be fabricated by coupling the lower support jig 214 longitudinally (i.e., in the left-right direction) to the first jig-coupling grooves 126 formed on the inner side of the front base frame 122*a*, by coupling the lower support jig 214 longitudinally (i.e., in the left-right direction of the third jig-coupling grooves 137 formed on the inner side of the free vise 136, by putting the wood piece to be fabricated on the lower support jig 214, and then moving forward the vise member 130.

Further, it is possible to uniformly mill the top of the wood piece at a desired work position by moving and fixing the router 300 at an Y-axial work position: by adjusting the Y-axial position (i.e., in the front-rear direction of the woodworking work table 100), using the Y-axial feeder 156; by moving and fixing the router 300 at a Z-axial work position by adjusting the Z-axial position (i.e., in the up-down direction of the woodworking work table 100) using the Z-axial feeder 158; and by moving the router 300 from a first end to a second end in the left-right direction of the woodworking work table 100 (i.e., in the X-axial direction) using the fixing block 154*b* of the X-axial feeder 154.

Next, it is possible to uniformly mill the top of the wood piece by moving and fixing the router 300 at the next Y-axial work position by adjusting the Y-axial position by a predetermined distance (i.e., in the front-rear direction of the woodworking work table 100) using the Y-axial feeder 156, moving the router 300 from the first end to the second end in the left-right direction of the woodworking work table 100 (i.e., in the X-axial direction), and then repeating this process.

It is possible to form various grooves (e.g., a U-shape, a V-shape, and a rectangular shape with an open top) by replacing and mounting end mills on the router in the similar way to the above description. Furthermore, it is possible to perform molding for forming a continuous rounded ends using a plurality of end mills. Furthermore, it is possible to perform various woodworking operations (e.g., milling, dovetailing, forming of a dowel, and copying) in this way.

Therefore, according to the preset invention, it is possible to easily form various shapes of grooves or joints such as circular, round, rectangular, dovetailed, and gallery-shaped grooves and joints by coupling and mounting jigs for fabricating a concave-convex structure corresponding to various joints to a multipurpose woodworking device.

Furthermore, according to the preset invention, it is possible to simultaneously form grooves and joints by coupling a jig for fabricating a concave-convex structure, which includes a shaping guide jig and a stopper jig that correspond to circular joints or round joints, to a woodworking work table; and by forming circular grooves or round grooves and circular joints or round joints that correspond to the grooves, respectively, at the portion to be jointed of a first wood piece and a second wood piece, so it is possible to easily fabricate a concave-convex structure within short time.

Furthermore, according to the preset invention, it is possible to simultaneously form rectangular grooves and joints by coupling a jig for fabricating a concave-convex structure, which includes a wood piece support jig and a stopper jig that correspond to rectangular joints or dovetail joints, to a woodworking work table; and by forming rectangular joints or dovetail joints at the portion to be jointed of a first wood piece and a second wood piece, so it is possible to easily fabricate a concave-convex structure within short time.

Furthermore, it is possible to easily form gallery groove having a desired size within short time by coupling a jig for fabricating a concave-convex structure, which includes a wood piece support jig or a shaping guide jig that corresponds to the gallery grooves, to a woodworking work table, and then by forming gallery grooves using the jig for fabricating a concave-convex structure.

Next, processes of forming circular grooves and circular joints, round grooves and round joints, rectangular joints, dovetail joints, and gallery grooves using jig for fabricating a concave-convex structure that is coupled to a multipurpose woodworking device.

Figure 16:
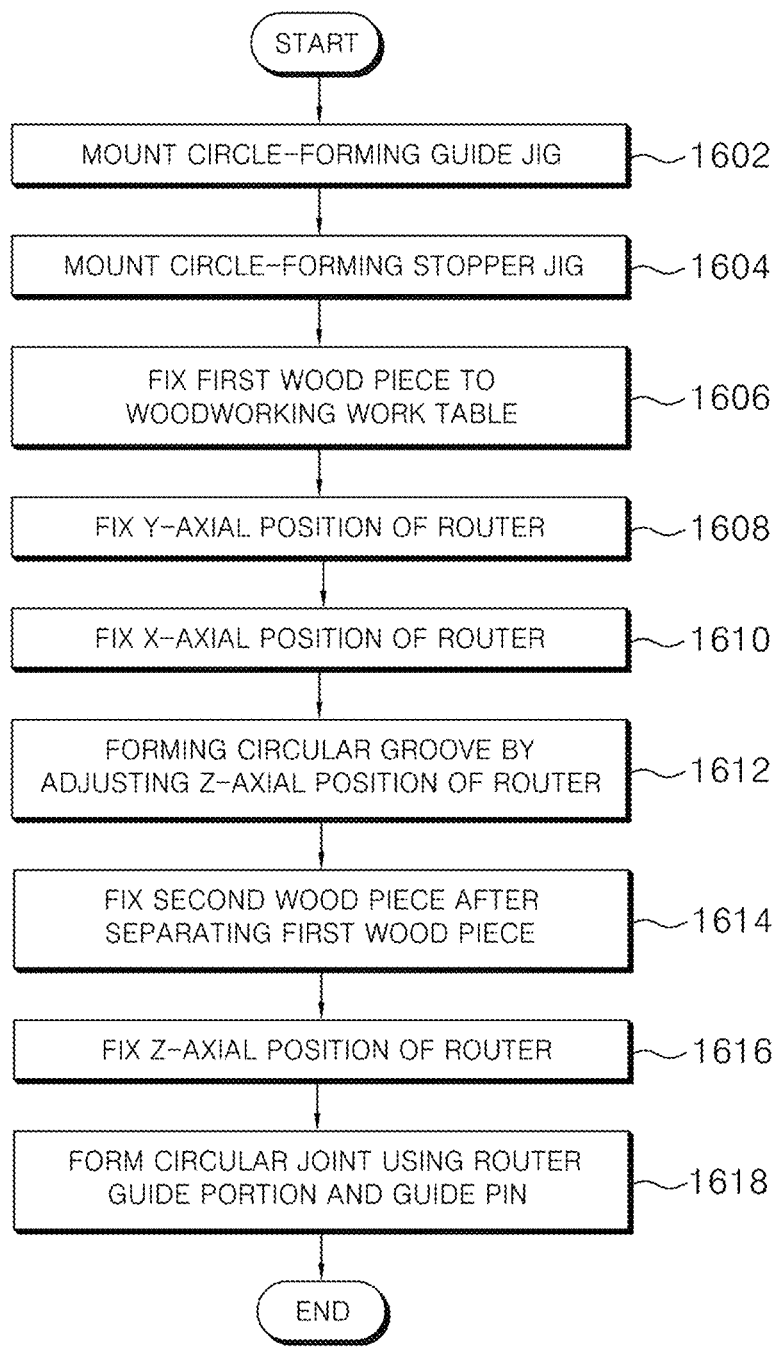
FIG. 16 is a flowchart showing a process of forming circular grooves and circular joints using a jig for fabricating a concave-convex structure in accordance with a seventh embodiment of the present invention.

FIG. 16 is a flowchart showing step by step a process of forming circular grooves and circular joints using a jig for fabricating a concave-convex structure in accordance with a seventh embodiment of the present invention. It is possible to mount the circle-forming guide jig 222 by inserting the circle-forming guide jig 222 including the guide jig body 222*a*, the router guide portions 222*b*, and the fabrication position support plate 222*c* into the first jig-coupling grooves 126 to be aligned with the inner end of the top (i.e., the rear end of the top) of the front base frame 122*a* of the base frame member 120 (step 1602).

It is possible to mount the circle-forming stopper jig 230*a* at the position where the stopper member 166*b* is rotated by inserting the circle-forming stopper jig 230*a* including the stopper jig block 232, the interval groove plate 234, and the interval grooves 236 into the first jig-coupling groove 126 formed at the position of the stopper 166 of the dimension guide 160 (step 1604).

Next, it is possible to fix a first wood piece by moving the moving vise 134 and the free vise 136 of the vise member 130 toward (i.e., forward) the front base frame 122*a* while supporting the first wood piece on a side of the fabrication position support plate 222*c* of the circle-forming guide jig 222 (step 1606).

Furthermore, it is possible to adjust and fix the Y-axial position of the router 300 at the woodworking position in the Y-axial direction (i.e., in the front-rear direction) using the Y-axial scale, the Y-axial indicator, and the Y-axial holder of the Y-axial feeder 156 (step 1608).

Furthermore, it is possible to adjust and fix the X-axial position of the router 300 at the woodworking position in the X-axial direction (i.e., in the left-right direction) by coupling and fixing the stopper 155 of the dimension guide 160 to the circle-forming stopper jig 230a (step 1610).

Next, it is possible to form a circular groove by moving down the router to a necessary depth for forming grooves of the first wood piece while adjusting the Z-axial position of the router 300 using the Z-axial feeder 158 (step 1612). It is possible to form a desired number of circular grooves by repeating the steps 1610 and 1612.

Meanwhile, when a desired number of circular grooves are formed on the first wood piece, it is possible to fix a second wood piece at the same position (i.e., the circular joint fabrication position) by separating the first wood piece by moving the moving vise 134 and the free vise 136 of the vise member 130 toward the rear base frame 122b (i.e., rearward), and then by moving the moving vise 134 and the free vise 136 of the vise member 130 toward the front base frame 122a (i.e., forward) (step 1614).

Next, it is possible to move an end mill to a Z-axial fabrication position of a circular joint by adjusting and fixing the Z-axial position of the router 300 using the Z-axial feeder 158 (1616).

Furthermore, it is possible to form a circular joint by moving the 300 in a way of operating the router 300 while adjusting the X-axial position and the Y-axial position of the router 300 using the X-axial feeder 154 and the Y-axial feeder 156 and then moving the guide pin 334 along the router guide portions 222b (step 1618). It is possible to form a desired circular joint, depending on the number of the router guide portions 222b.

Figure 17:
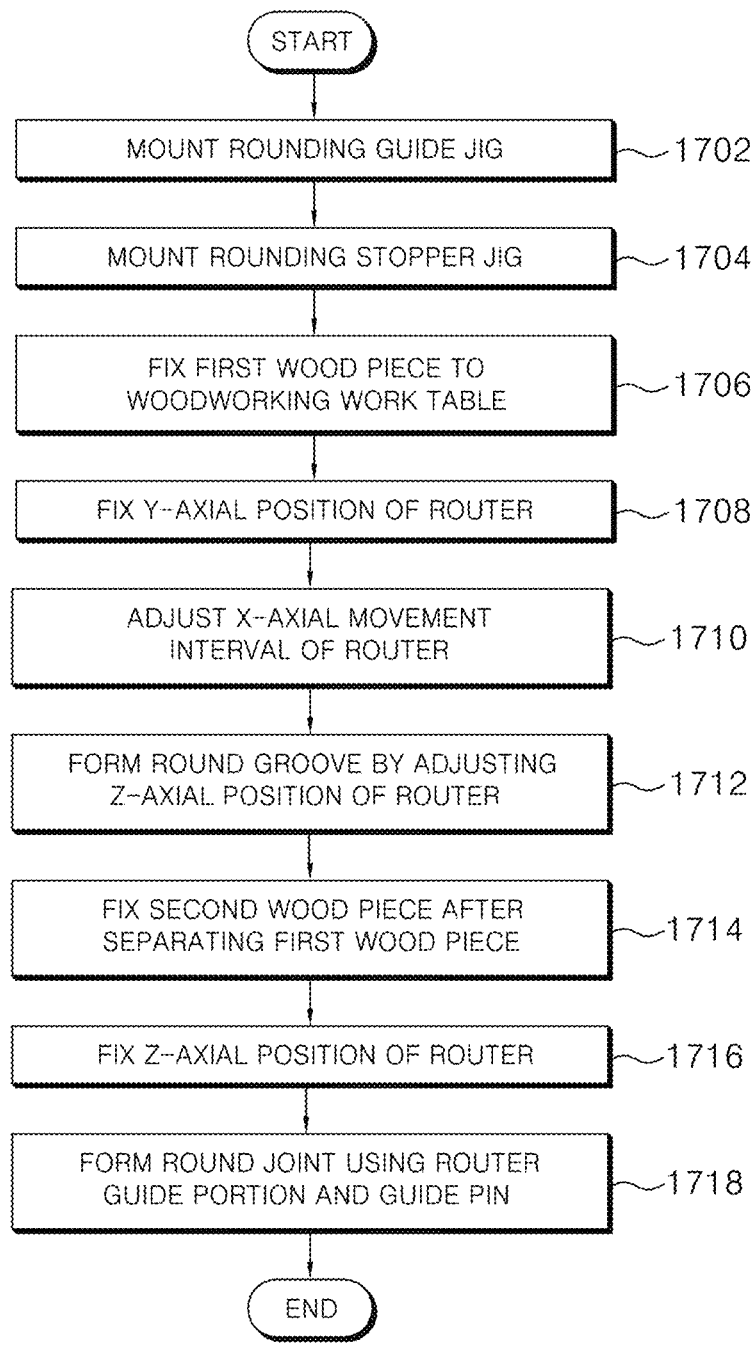
FIG. 17 is a flowchart showing a process of forming round grooves and round joints using a jig for fabricating a concave-convex structure in accordance with an eighth embodiment of the present invention.

FIG. 17 is a flowchart showing step by step a process of forming round grooves and round joints using a jig for fabricating a concave-convex structure in accordance with a seventh embodiment of the present invention. It is possible to mount the rounding guide jig 224 by inserting the rounding guide jig 224 including the guide jig body 224a, the guide block 224b, the router guide portion 224c, and the guide adjusters 224d into the first jig-coupling grooves 126 to be aligned with the inner end of the top (i.e., the rear end of the top) of the front base frame 122a of the base frame member 120 (step 1702).

It is possible to mount the rounding stopper jig 230a at the position where the stopper member 166b is rotated by inserting the rounding stopper jig 230b including the stopper jig block 232, the interval groove plate 234, and the interval grooves 236 into the first jig-coupling groove 126 formed at the position of the stopper 166 of the dimension guide 160 (step 1704).

Next, it is possible to fix a first wood piece by moving the moving vise 134 and the free vise 136 of the vise member 130 toward (i.e., forward) the front base frame 122a while supporting the first wood piece on a side of the fabrication position support plate (not shown) of the rounding guide jig 222 (step 1706).

Furthermore, it is possible to adjust and fix the Y-axial position of the router 300 at a woodworking position in the Y-axial direction (i.e., in the front-rear direction) using the Y-axial scale, the Y-axial indicator, and the Y-axial holder of the Y-axial feeder 156 (step 1708).

Furthermore, it is possible to maintain the X-axial position of the router 300 by the left-right length of a round groove by positioning the stopper 166 of the dimension guide 160 to an interval groove 236 of the rounding stopper jig 230b to be able to move left and right by the length of the round groove (step 1710).

Next, it is possible to form a round groove by moving down the router to a necessary depth for forming grooves of the first wood piece while adjusting the Z-axial position of the router 300 using the Z-axial feeder 158 (step 1712).

Meanwhile, when a round groove is formed on the first wood piece, it is possible to fix a second wood piece at the same position (i.e., the round joint fabrication position) by separating the first wood piece by moving the moving vise 134 and the free vise 136 of the vise member 130 toward the rear base frame 122b (i.e., rearward), and then by moving the moving vise 134 and the free vise 136 of the vise member 130 toward the front base frame 122a (i.e., forward) (step 1714).

Next, it is possible to move an end mill to a Z-axial fabrication position of a round joint by adjusting and fixing the Z-axial position of the router 300 using the Z-axial feeder 158 (step 1716).

Furthermore, it is possible to form a round joint by moving the 300 in a way of operating the router 300 while adjusting the X-axial position and the Y-axial position of the router 300 using the X-axial feeder 154 and the Y-axial feeder 156 and then moving the guide pin 334 along the router guide portion 224c (step 1718).

Furthermore, according to the preset invention, it is possible to simultaneously form grooves and joints by coupling a jig for fabricating a concave-convex structure, which includes a shaping guide jig and a stopper jig that correspond to circular joints or round joints, to a woodworking work table; and by forming circular grooves or round grooves and circular joints or round joints that correspond to the grooves, respectively, at the portion to be jointed of a first wood piece and a second wood piece, so it is possible to easily fabricate a concave-convex structure within short time.

Figure 18:
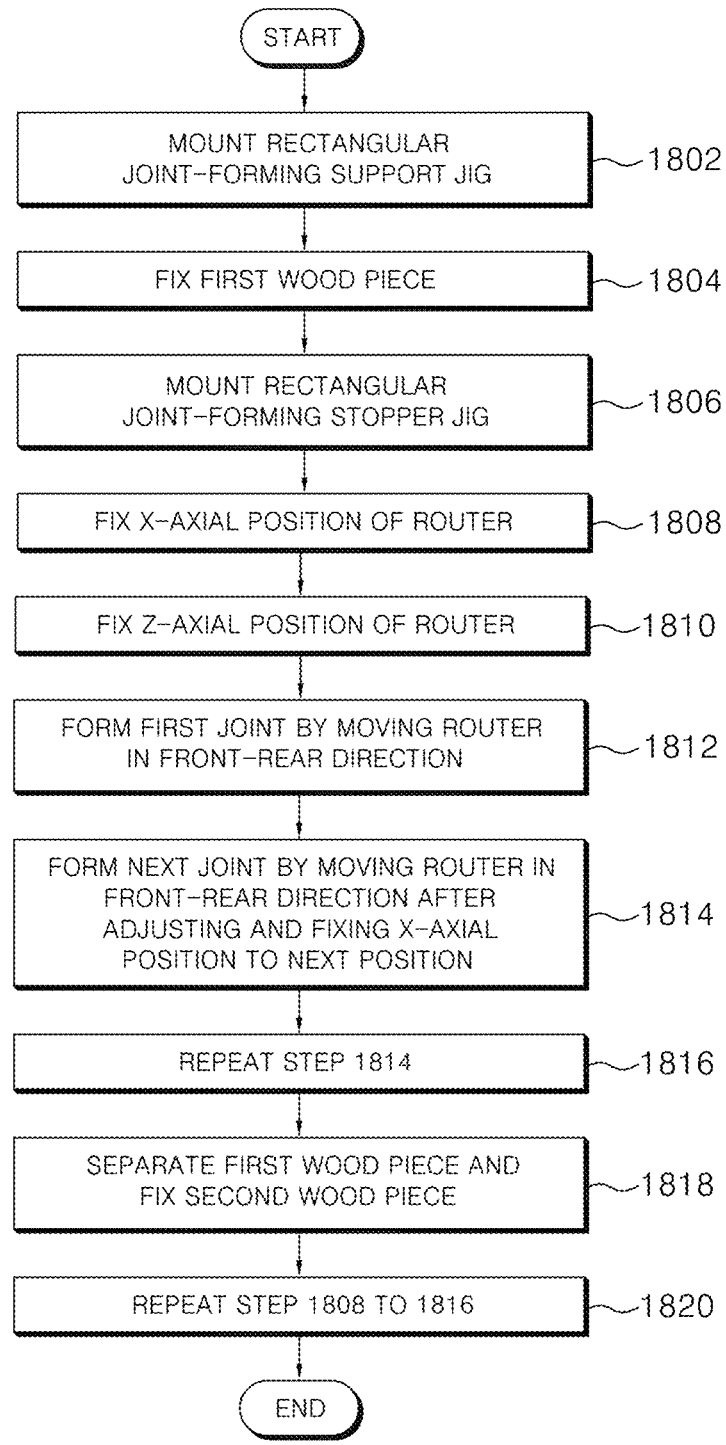
FIG. 18 is a flowchart showing a process of forming rectangular joints using a jig for fabricating a concave-convex structure in accordance with a ninth embodiment of the present invention.

FIG. 18 is a flowchart showing step by step a process of forming rectangular joints using a jig for fabricating a concave-convex structure in accordance with a ninth embodiment of the present invention. It is possible to mount the rectangular tail-forming support jig 212 on the woodworking work table 100; by moving the rectangular tail-forming support jig 212 including the wood piece support plate 212a, the recessed seat 212b, the support jig body 212c, and the assistant blocks 212d between the front base frame 122a and the free vise 136; and then by moving and fixing the moving vise 134 and the free vise 136 of the vice member 130 toward (i.e., forward) of the front base frame 122a (step 1802).

Furthermore, it is possible to fix a first wood piece to be fabricated by putting the first wood piece on the wood piece support plate 212a inside the rectangular tail-forming support jig 212 and then inserting the assistant blocks 212d in both sides of the first wood piece as much as the widths of the sides to fill the empty space of the support jig body 212c (step 1804). It is possible to prevent the rectangular tail-forming support jig 212 from interfering with the rectangular tail-forming due to spaces at both ends in woodworking, by using the assistant blocks 212d.

It is possible to mount the rectangular tail-forming stopper jig 230c at the position where the stopper member 166b is rotated by inserting the rectangular tail-forming stopper jig 230c including the stopper jig block 232, the interval groove plate 234, and the interval grooves 236 into the first jig-coupling groove 126 formed at the position of the stopper 166 (step 1806).

Next, it is possible to adjust and fix the X-axial position of the router 300 at the first joint fabrication position in the X-axial direction (i.e., in the left-right direction) by turning and fixing the stopper 166 of the dimension guide 160 to the first interval groove 236 formed on the rectangular tail-forming stopper jig 230c (step 1808).

Next, it is possible to move an end mill to a Z-axial fabrication position of rectangular joint by adjusting and fixing the Z-axial position of the router 300 using the Z-axial feeder 158 (step 1810).

Furthermore, it is possible to form a first joint end of a rectangular joint by operating and moving the router 300 in the front-rear direction of the woodworking work table 100 (step 1812).

Next, it is possible to form the next tail end of a rectangular tail by fixing the X-axial fabrication position of the router 300 at the next position by inserting the stopper 166 into the next groove of the interval grooves 236, and then by operating and moving the woodworking work table 100 in the front-rear direction (step 1814).

It is possible to form a desired amount of rectangular tails by repeating the process of step 1814 described above (step 1816).

Meanwhile, it is possible to fix a second wood piece to be combined with the first wood piece in the way of step 1804 after separating the first wood piece from the rectangular tail-forming support jig 212 when rectangular tail-forming on the first wood piece is finished (step 1818).

Next, it is possible to form rectangular joints on second wood piece by performing the process from step 1808 to step 1816 on the second wood piece (step 1820).

Meanwhile, in common rectangular-tail forming, it is also possible to form rectangular joints using only the rectangular tail-forming stopper jig 230c with a wood piece to be fabricated fixed between the front base frame 122a and the free vise 136, as shown in FIG. 12c.

Figure 19:
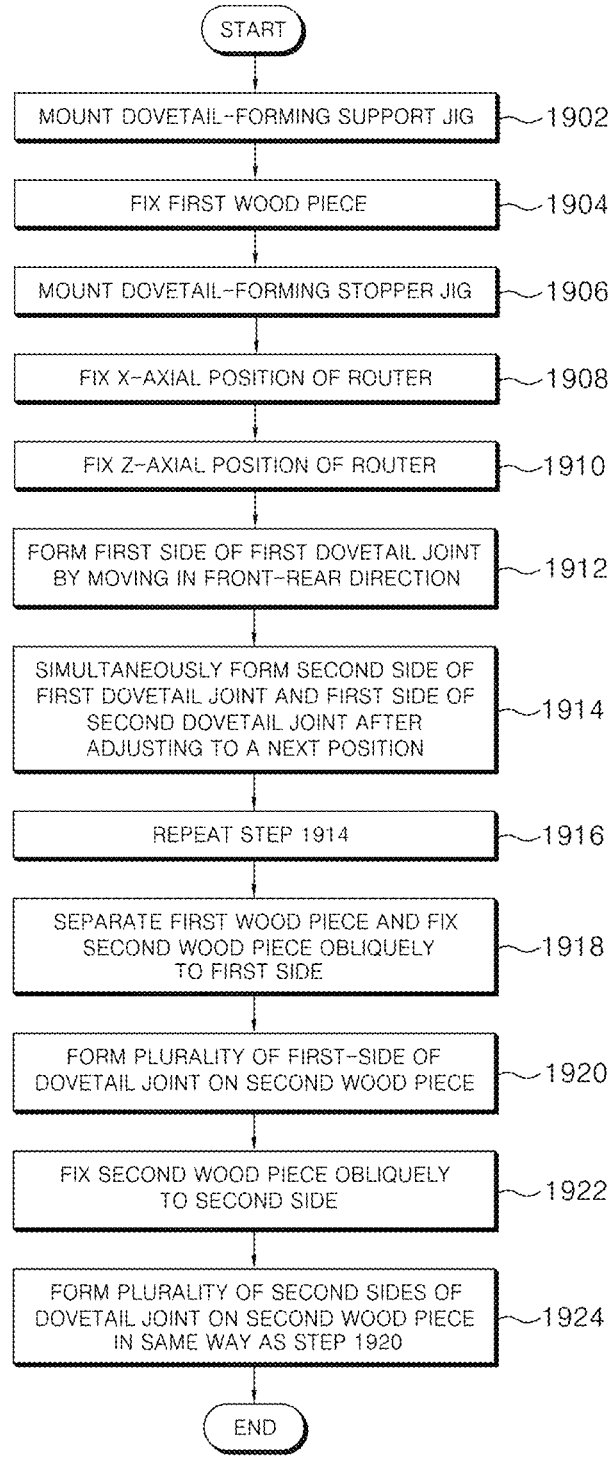
FIG. 19 is a flowchart showing a process of forming dovetail joints using a jig for fabricating a concave-convex structure in accordance with a tenth embodiment of the present invention.

FIG. 19 is a flowchart showing step by step a process of forming dovetail joints using a jig for fabricating a concave-convex structure in accordance with a tenth embodiment of the present invention. It is possible to mount the dovetail-forming support jig 214 on the woodworking work table 100; by moving the dovetail-forming support jig 214 including the wood piece support plate 212a, the recessed seat 212b, the support jig body 212c, and the first assistant blocks and the second assistant blocks 214e between the front base frame 122a and the free vise 136; and then fixing and moving the moving vise 134 and the free vise 136 of the vise member 130 toward the front base frame 122a (i.e., forward) (step 1902).

Furthermore, it is possible to fix a first wood piece to be fabricated by putting the first wood piece on the wood piece support plate inside the dovetail-forming support jig 214 and then inserting the first assistant blocks in both sides of the first wood piece as much as the widths of the sides to fill the empty space of the support jig body 214c (step 1904). It is possible to prevent the dovetail-forming support jig 214 from interfering with the dovetail-forming due to spaces at both ends in woodworking, by using the first assistant blocks.

It is possible to mount the dovetail-forming stopper jig 230d at the position where the stopper member 166b is rotated by inserting the dovetail-forming stopper jig 230d including the stopper jig block 232, the interval groove plate 234, and the interval grooves 236 into the first jig-coupling groove 126 formed at the position of the stopper 166 (step 1906).

Next, it is possible to adjust and fix the X-axial position of the router 300 with a dovetail end mill at the first joint fabrication position in the X-axial direction (i.e., in the left-right direction) by turning and fixing the stopper 166 of the dimension guide 160 to the first interval groove 236 formed on the dovetail-forming stopper jig 230d (step 1908).

Next, it is possible to move an end mill to a Z-axial fabrication position of dovetail joint by adjusting and fixing the Z-axial position of the router 300 using the Z-axial feeder 158 (step 1910).

Furthermore, it is possible to form a first side of a first dovetail joint by operating and moving the router 300 in the front-rear direction of the woodworking work table 100 (step 1912).

Next, it is possible to simultaneously form a second side of the first dovetail and a first side of a second dovetail by fixing the X-axial fabrication position of the router 300 at the next position by inserting the stopper 166 into the next groove of the interval grooves 236, and then by operating and moving the woodworking work table 100 in the front-rear direction (step 1914).

It is possible to form a desired number of dovetails by repeating the process of step 1916 described above (step 1916).

Meanwhile, when a desired number of dovetail joints are formed on the first wood piece, it is possible to obliquely fix a second wood piece in the dovetail-forming support jig 214, using the oblique second assistant blocks 214e, by replacing the dovetail end mill coupled to the router 300 with a straight end mill to form dovetail joints to be vertically coupled to the first wood piece on the first wood piece after separating the first wood piece from the dovetail-forming support jig 214 (step 1918).

Furthermore, it is possible to form first sides of a plurality of dovetail joints on the second wood piece: by forming a first side of a first dovetail joint by moving the router 300 in the front-rear direction of the second wood piece fixed inside the dovetail-forming support jig 214 after fixing the X-axial position of the fixed second wood piece by inserting the stopper member 116b in the first groove of the interval grooves 236 of the dovetail-forming stopper jig 230d and adjusting and fixing the Z-axial position (i.e., up-down position) of the router 300 using the Z-axial feeder 158; and by forming a first side of a second dovetail joint through the above process after adjusting the X-axial position by inserting the stopper member 166b in the second groove of the interval grooves 236 (step 1920).

Next, it is possible to fix again the second wood piece by putting the second wood piece inside the dovetail-forming support jig 214 in the opposite direction and then coupling the second assistant blocks 214e fixing the second wood piece, obliquely in the opposite direction to that in step 1918 (step 1922).

Next, it is possible to form second sides of a plurality of dovetail joints on the second wood piece by performing step 1920 on the re-fixed second wood piece (step 1924).

Therefore, according to the preset invention, it is possible to simultaneously form rectangular grooves and joints: by coupling a jig for fabricating a concave-convex structure, which includes a wood piece support jig and a stopper jig that correspond to rectangular joints or dovetail joints, to a woodworking work table; and by forming rectangular joints or dovetail joints at the portion to be jointed of a first wood piece and a second wood piece, so it is possible to easily fabricate a concave-convex structure within short time.

Figure 20:
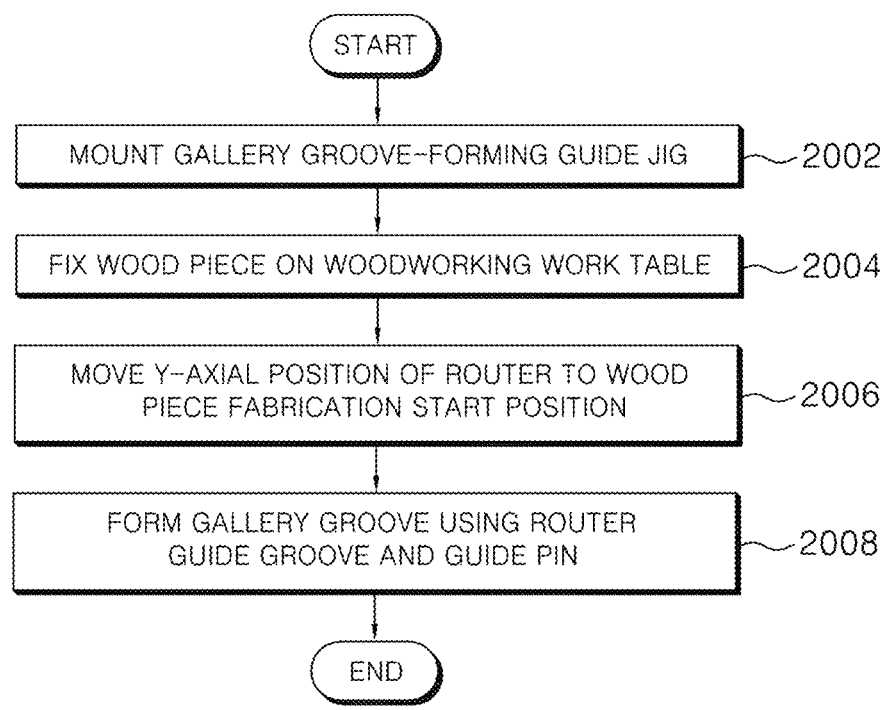
FIG. 20 is a flowchart showing a process of forming gallery grooves using a jig for fabricating a concave-convex structure in accordance with an eleventh embodiment of the present invention.

FIG. 20 is a flowchart showing step by step a process of forming gallery grooves using a jig for fabricating a concave-convex structure in accordance with an eleventh embodiment of the present invention. It is possible to mount the gallery groove-forming guide jig 226 by inserting the gallery groove-forming guide jig 226 including the guide jig body 226a and the router guide groove 226b into the first jig-coupling grooves 126 to be aligned with the inner end of the top (i.e., the rear end of the top) of the front base frame 122a of the base frame member 120 (step 2002).

Next, it is possible to fix a wood piece by moving the moving vise 134 and the free vise 136 of the vise member 130 toward (i.e., forward) the front base frame 122a while supporting the wood piece on a side of the fabrication position support plate (not shown) of the gallery groove-forming guide jig 226 (step 2004).

Furthermore, it is possible to move the Y-axial position of the router 300 at a woodworking start position in the Y-axial direction (i.e., in the front-rear direction) using the Y-axial scale, the Y-axial indicator, and the Y-axial holder of the Y-axial feeder 156 (step 2006).

Next, it is possible to form gallery grooves by adjusting the X-axial position and the Z-axial position of the router 300 using the X-axial feeder 154 and the Z-axial feeder 159 with the router 300 operating while moving the guide pin 334 along the router guide groove 226b (step 2008).

Figure 21:
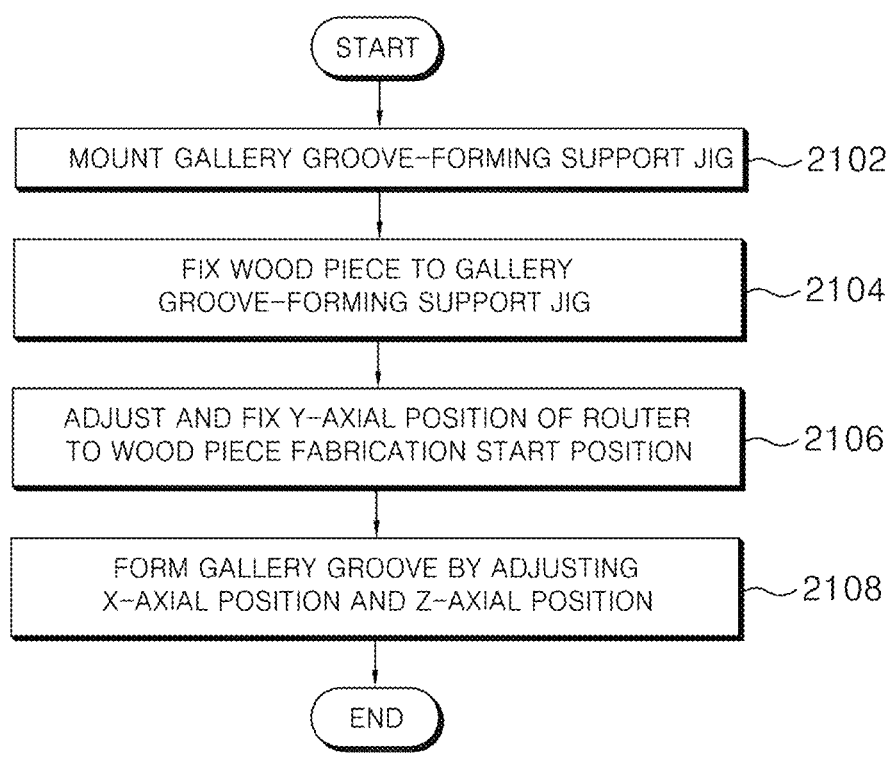
FIG. 21 is a flowchart showing a process of forming gallery grooves using a jig for fabricating a concave-convex structure in accordance with a twelfth embodiment of the present invention.

FIG. 21 is a flowchart showing step by step a process of forming gallery grooves using a jig for fabricating a concave-convex structure in accordance with a twelfth embodiment of the present invention. It is possible to obliquely couple and mount (e.g., at an angle corresponding to the slope of gallery grooves to be fabricated) the gallery groove-forming support jig 216 including the support jig body 216a, the rotational shaft rod 216b, the wood piece holder 216c, and the position indicator 216b on the woodworking work table 10, using at least two selected from the front base frame 122a, the rear base frame 122b, the moving vise 134, and the free vise 136 (step 2102).

Furthermore, it is possible to put a wood piece to be fabricated inside the gallery groove-forming support jig 216 and fix the wood piece by turning the wood piece holder 216 with the fabrication position maintained, with reference to the position indicator 216c (step 2104).

Next, it is possible to adjust and fix the Y-axial direction of the router 300 at a woodworking position in the Y-axial direction (i.e., in the front-rear direction) using the Y-axial scale, the Y-axial indicator, and the Y-axial holder of the Y-axial feeder 156 (step 2106).

Next, it is possible to gallery grooves on the wood piece by moving the router 300 by the gap between the gallery grooves in the left-right direction of the woodworking work table by adjusting the X-axial position and the Z-axial position of the router 300 using the X-axial feeder 154 and the Z-axial feeder 158 with the router 300 operating (step 2108).

Meanwhile, in order to form gallery grooves having an opposite slope, it is possible to easily form the gallery grooves having an opposite slope by coupling and mounting the gallery groove-forming support jig 216 to have an opposite slope on the woodworking work table 100.

Furthermore, it is possible to easily form gallery groove having a desired size within short time by coupling a jig for fabricating a concave-convex structure, which includes a wood piece support jig or a shaping guide jig that corresponds to the gallery grooves, to a woodworking work table, and then by forming gallery grooves using the jig for fabricating a concave-convex structure.

Although the present invention was described above with reference to various embodiments, the present invention is not limited thereto and it would be apparent to those skilled in the art that the present invention may be replaced, modified, and changed without departing from the spirit of the present invention.

<Description of the Reference Numerals in the Drawings>
100: woodworking work table 110: support post
120: base frame member
130: vise member
140: slider
150: feeding device
160: dimension guide
170: wood piece support
200: jig for fabricating concave-convex structure
212, 214, 216: wood piece support jig
222, 224, 226: shaping guide jig
230: stopper jig
300: router
310: router support
320: router module
330: router guide
340: router operator

What is claimed is:

1. A jig for fabricating a concave-convex structure in a wood piece with a woodworking work table that has a stopper, jig-coupling grooves and a router performing a concave-convex fabrication using a plurality of end mills, wherein the jig comprises:

a wood piece support jig supporting or fixing the wood piece to be fabricated, the wood piece support jig including a support plate with a bottom surface facing the woodworking work table and an opposite top surface on which the wood piece is supported, a jig body having a rectangular shape with open top and bottom and an open side and having a recessed seat into which the support plate is inserted, and an assistant block seated on the support plate for supporting a side of the wood piece; and a stopper jig maintaining X-axial movement of the router at intervals corresponding to the concave-convex fabrication, the stopper jig including a stopper jig block, an interval groove plate protruding from a top of the stopper jig block, and interval grooves formed on a top of the interval groove plate into which the stopper of the woodworking work table is inserted.

2. The jig of claim 1, wherein the wood piece support jig is a rectangular tail-forming support jig; and
the stopper jig is a rectangular tail-forming stopper jig.

3. The jig of claim 1, wherein the wood piece support jig is a dovetail-forming support jig; and
the stopper jig is a dovetail-forming stopper jig.

4. A jig for fabricating a concave-convex structure in a wood piece with a woodworking work table that has a stopper, jig-coupling grooves and a router performing a concave-convex fabrication using a plurality of end mills, wherein the jig comprises:

a circle-forming guide jig for forming circular grooves and circular joints in the wood piece, the circle-forming guide jig including a guide jig body and a plurality of circular router guide portions protruding from a top of the guide jig body and being spaced apart from each other with intervals; and a circle-forming stopper jig maintaining X-axial intervals of the circular grooves and the circular joints, the circle-forming stopper jig including a stopper jig block, an interval groove plate protruding from a top of the stopper jig block, and interval grooves formed on a top of the interval groove plate spaced apart from each other with intervals, the interval grooves being configured to receive the stopper of the woodworking work table thereinto.

5. A jig for fabricating a concave-convex structure in a wood piece with a woodworking work table that has a stopper, jig-coupling grooves and a router performing a concave-convex fabrication using a plurality of end mills, wherein the jig comprises:
a rounding guide jig for forming round grooves and round joints in the wood piece, the rounding guide jig including a guide jig body and a router guide portion protruding from a top of the guide jig body to correspond to shapes of the round grooves and the round joints; and
a rounding stopper jig maintaining X-axial intervals of the round grooves and the round joints, the rounding stopper jig including a stopper jig block, an interval groove plate protruding from a top of the stopper jig block, and interval grooves formed on a top of the interval groove plate spaced apart from each other with intervals, the interval grooves being configured to receive the stopper of the woodworking work table thereinto.

6. A method of fabricating a concave-convex structure using a jig for fabricating a concave-convex structure, the method comprising:
mounting a circle-forming guide jig and a circle-forming stopper jig on a woodworking work table to form circular grooves and circular joints, wherein:
the circle-forming guide jig includes a guide jig body and a plurality of circular router guide portions protruding from a top of the guide jig body and being spaced apart from each other with intervals; and
the circle-forming stopper jig includes a stopper jig block, an interval groove plate protruding from a top of the stopper jig block, and interval grooves formed on a top of the interval groove plate into which a stopper of the woodworking work table is inserted;
fixing a first wood piece to form the circular grooves thereon on the woodworking work table while supporting the first wood piece on a side of a fabrication position support plate of the circle-forming guide jig;
inserting the stopper of the woodworking work table into one of the interval grooves on the interval groove plate and fixing an X-axial position of a router that has an end mill for forming the circular grooves and the circular joints, and fixing a Y-axial position of the router, and then forming a first one of the circular grooves on the first wood piece by adjusting a Z-axial position of the router; then
releasing the stopper from said one of the interval grooves, and then inserting the stopper of the woodworking work table into another of the interval grooves on the interval groove plate, with the circle-forming stopper jig mounted on the woodworking work table, and fixing the Y-axial position of the router, and then forming a second one of the circular groove on the first wood piece by adjusting the Z-axial position of the router; and
repeatedly forming the circular grooves on the first wood piece by adjusting the X-axial position of the router relative to the interval groove plate using the interval grooves.

7. The method of claim 6, further comprising:
fixing a second wood piece to form the circular joints thereon after separating the first wood piece when forming a desired number of circular grooves on the first wood piece, wherein the second wood piece is fixed to a same position on the woodworking work table as the first wood piece; and
forming the circular joints by the number of the circular grooves by moving the router along the router guide portions protruding on the circle-forming guide jig while adjusting the X-axial position and the Y-axial position of the router after fixing the Z-axial position of the router.

8. A method of fabricating a concave-convex structure using a jig for fabricating a concave-convex structure, the method comprising:
mounting a rounding guide jig and a rounding stopper jig on a woodworking work table to form round grooves and round joints, wherein:
the rounding guide jig includes a guide jig body and a router guide portion protruding from a top of the guide jig body to correspond to shapes of the round grooves and the round joints; and
the rounding stopper jig includes a stopper jig block, an interval groove plate protruding from a top of the stopper jig block, and interval grooves formed on a top of the interval groove plate spaced apart from each other with intervals, the interval grooves being configured to receive a stopper of the woodworking work table thereinto;
fixing a first wood piece to form the round grooves thereon on the woodworking work table while supporting the first wood piece on a side of a fabrication position support plate of the rounding guide jig;
inserting the stopper of the woodworking work table into one of the interval grooves on the interval groove plate; and
forming the round grooves on the first wood piece by adjusting a Z-axial position of a router having an end mill for forming the round grooves and the round joints after fixing a Y-axial position of the router and maintaining the router to be movable left and right by a length of the round grooves using the interval grooves on the rounding stopper jig.

9. The method of claim 8, further comprising:
fixing a second wood piece to form the round joints thereon after separating the first wood piece when forming the round grooves on the first wood piece, wherein the second wood piece is fixed to a same position on the woodworking work table as the first wood piece; and
forming the round joints by moving the router along the router guide portions on the rounding guide jig while adjusting the X-axial position and the Y-axial position of the router after fixing the Z-axial position of the router.

10. A method of fabricating a concave-convex structure using a jig for fabricating a concave-convex structure, the method comprising:
mounting a rectangular tail-forming support jig and a rectangular tail-forming stopper jig on a woodworking work table to form rectangular joints;
fixing a first wood piece to form a first-wood piece rectangular joint including a plurality of first-wood joint ends thereon on a wood piece support plate disposed inside the rectangular tail-forming support jig, wherein:
the rectangular tail-forming support jig includes a support plate with a bottom surface facing the woodworking work table and an opposite top surface on which the first wood piece is supported, a jig body having a rectangular shape with open top and bottom and an open side and having a recessed seat into which the support plate is inserted, and an assistant block seated on the support plate for supporting a side of the first wood piece; and the rectangular tail-forming stopper jig includes a stopper jig block, an interval groove plate protruding from a top of the stopper jig block, and interval grooves formed on a top of the interval groove plate into which a stopper of the woodworking work table is inserted;

inserting the stopper of the woodworking work table into a first one of the interval grooves on the interval groove plate and fixing an X-axial position of a router that has an end mill, and then forming a first one of the first-wood joint ends by fixing a Z-axial position of the router and moving the router in a front-rear direction of the woodworking work table;

releasing the stopper from the first one of the interval grooves, and then inserting the stopper into a second one of the interval grooves on the interval groove plate to fix the X-axial position of the router, and then forming a second one of the first-wood joint ends by moving the router.

11. The method of claim 10, further comprising:

fixing a second wood piece to form a second-wood piece rectangular joint including a plurality of second-wood joint ends thereon after separating the first wood piece;

inserting the stopper into the first one of the interval grooves on the interval groove plate and fixing the X-axial position of the router, and then, forming a first one of the second-wood joint ends by moving the router in the front-rear direction of the woodworking work table after fixing the Z-axial position of the router;

releasing the stopper from the first one of the interval grooves, and then inserting the stopper into the second one of the interval grooves on the interval groove plate to fix the X-axial position of the router, and then forming a second one of the second-wood joint ends by moving the router.

12. A method of fabricating a concave-convex structure using a jig for fabricating a concave-convex structure, the method comprising:

mounting a dovetail-forming support jig and a dovetail-forming stopper jig on a woodworking work table to form dovetail joints;

fixing a first wood piece to form a first-wood piece dovetail joint including a plurality of first-wood joint ends thereon on a wood piece support plate disposed inside the dovetail-forming support jig, wherein:

the dovetail-forming support jig includes a support plate with a bottom surface facing the woodworking work table and an opposite top surface on which the first wood piece is supported, a jig body having a rectangular shape with open top and bottom and an open side and having a recessed seat into which the support plate is inserted, and an assistant block seated on the support plate for supporting a side of the first wood piece; and the dovetail-forming stopper jig includes a stopper jig block, an interval groove plate protruding from a top of the stopper jig block, and interval grooves formed on a top of the interval groove plate into which the stopper of the woodworking work table is inserted;

inserting the stopper into a first one of the interval grooves on the interval groove plate and fixing an X-axial position of a router that has an end mill, and then, forming a first one of the first-wood joint ends by fixing a Z-axial position of the router and moving the router in a front-rear direction of the woodworking work table;

releasing the stopper from the first one of the interval grooves, and then inserting the stopper into a second one of the interval grooves on the interval groove plate to fix the X-axial position of the router, and then forming a second one of the first-wood joint ends by moving the router.

13. The method of claim 12, further comprising:

fixing a second wood piece to form a second-wood piece dovetail joint including a plurality of second-wood joint ends;

inserting the stopper into the first one of the interval grooves on the interval groove plate and fixing the X-axial position of the router, and then forming a first one of the second-wood joint ends by moving the router;

releasing the stopper from the first one of the interval grooves, and then inserting the stopper into the second one of the interval grooves on the interval groove plate to fix the X-axial position of the router, and then forming a second one of the second-wood joint ends by moving the router.

\* \* \* \* \*